US011009872B2

(12) United States Patent
Ishikawa et al.

(10) Patent No.: US 11,009,872 B2
(45) Date of Patent: May 18, 2021

(54) VEHICLE CONTROLLER

(71) Applicant: HONDA MOTOR CO., LTD., Tokyo (JP)

(72) Inventors: Hisashi Ishikawa, Wako (JP); Kentaro Arai, Wako (JP); Masayuki Sadakiyo, Wako (JP); Takashi Adachi, Wako (JP); Tomoyuki Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 16/233,267

(22) Filed: Dec. 27, 2018

(65) Prior Publication Data
US 2019/0204828 A1 Jul. 4, 2019

(30) Foreign Application Priority Data

Dec. 28, 2017 (JP) .............................. JP2017-254915

(51) Int. Cl.
| | |
|---|---|
| *G05D 1/00* | (2006.01) |
| *G05D 1/02* | (2020.01) |
| *B60W 50/08* | (2020.01) |
| *B60W 10/20* | (2006.01) |
| *B60W 10/18* | (2012.01) |
| *B60W 50/10* | (2012.01) |
| *B60W 10/04* | (2006.01) |
| *B60W 30/18* | (2012.01) |

(52) U.S. Cl.
CPC ........... *G05D 1/0061* (2013.01); *B60W 10/04* (2013.01); *B60W 10/18* (2013.01); *B60W 10/20* (2013.01); *B60W 50/082* (2013.01); *B60W 50/10* (2013.01); *G05D 1/0223* (2013.01); *B60W 30/18154* (2013.01); *B60W 2552/15* (2020.02)

(58) Field of Classification Search
CPC . G05D 1/0061; G05D 1/0223; B60W 50/082; B60W 10/20; B60W 10/18; B60W 50/10; B60W 10/04; B60W 2552/15; B60W 30/18154; B60W 30/045; B60W 50/12; B60W 10/10; B60W 10/11; B60W 30/182; B60W 40/08
See application file for complete search history.

(56) References Cited

FOREIGN PATENT DOCUMENTS

| JP | 8-159278 A | 6/1996 |
|---|---|---|
| JP | 2011-213162 A | 10/2011 |
| JP | 2017-146819 A | 8/2017 |
| JP | 2017-217963 A | 12/2017 |

OTHER PUBLICATIONS

Office Action dated Dec. 10, 2019, issued in counterpart JP application No. 2017-254915, with English translation. (8 pages).
Office Action dated Jun. 11, 2019, issued in counterpart JP Application No. 2017-254915, with English translation (10 pages).

*Primary Examiner* — Michael V Kerrigan
(74) *Attorney, Agent, or Firm* — Westerman, Hattori, Daniels & Adrian, LLP

(57) ABSTRACT

If the driver operates the operation tool while the vehicle is traveling under the automated drive control, override control is performed in which the acceleration/deceleration of the vehicle is controlled according to the operation of the operation tool, when an automated drive target gear position selected based on automatic control of the acceleration/deceleration of the vehicle equals a manual drive target gear position determined according to the operation of the operation tool by the driver.

12 Claims, 14 Drawing Sheets

VEHICLE CONTROLLER

CROSS REFERENCES TO RELATED APPLICATIONS

The present application claims priority under 35 U.S.C. § 119 to Japanese Patent Application No. 2017-254915, filed Dec. 28, 2017, entitled "Vehicle Controller." The contents of this application are incorporated herein by reference in their entirety.

BACKGROUND

1. Field

The present disclosure relates to a vehicle controller, and more specifically to a vehicle controller configured to perform automated drive control that automatically controls at least one of acceleration/deceleration and steering of a host vehicle and a system including the vehicle controller.

2. Description of the Related Art

Conventionally, as disclosed in Japanese Unexamined Patent Application Publication No. 2017-146819, there is a vehicle controller including an automated drive control unit that automatically controls at least one of acceleration/deceleration and steering of a host vehicle so that the host vehicle can drive along a route to a destination.

In the vehicle controller as described above, if a driver operates (overrides) an operation member such as an accelerator pedal or a brake pedal while a vehicle is traveling under automated drive control or if a request to switch from the automated drive mode (automated drive controlled state) to a manual drive mode (manual drive controlled state) is made, there is a need to shift a vehicle driving force from the vehicle driving force in the automated drive mode to a driving force requested by the vehicle driver in the manual drive mode. There is a problem, however, that if the vehicle in the automated drive mode makes a shift between these driving forces while being accelerating or decelerating, it is difficult for the vehicle driver to smoothly adjust the acceleration or the deceleration of the vehicle.

For example, in the automated drive mode, if the aforementioned override or a switch to the manual drive mode takes place while the vehicle is traveling with a high driving force (such as during uphill traveling), it is difficult for the driver to adjust the acceleration of the vehicle to the previous acceleration by operating the accelerator pedal. Due to such difficulty, there is a risk that the driver may perform an inappropriate operation such as depressing the accelerator pedal till the kickdown is actuated. Similarly, if the aforementioned override or the switch to the manual drive mode takes place when the vehicle is traveling with a high braking force generated such as during uphill traveling or traveling on a winding road in the automated drive mode, it is difficult for the driver to adjust the deceleration by operating the brake pedal to the deceleration in the automated drive mode. Thus, there is a risk that the vehicle may sharply decelerate as a result of the driver depressing the brake pedal more than necessary. In addition, there is another risk that if the vehicle in a turning state changes a gear position when the automated drive mode switches to the manual drive mode, a yaw rate of the vehicle may change and behavior of the vehicle may become unstable.

There is a need to provide a vehicle controller that, if a driver operates (overrides) an operation member such as an accelerator pedal or a brake pedal or makes a request to switch from an automated drive mode to a manual drive mode while a vehicle is traveling under automated drive control, can easily adjust acceleration or deceleration according to an operation of the operation member by the vehicle driver to the acceleration or deceleration in the automated drive mode and achieve a smooth shift of the acceleration or the deceleration.

SUMMARY

The present application aims at solving the above-mentioned problems. In one aspect, the present application provides a vehicle controller (100) including an automated drive control unit (110) configured to perform automated drive control that automatically controls at least acceleration/deceleration of a vehicle (1). Here, the vehicle (1) includes: an automatic transmission (TM) configured to vary a speed of a rotation caused by a driving force transmitted from a driving source (EG) and to output the rotation to a drive wheel side; and an operation member (70, 72) with which a driver performs an operation to change the acceleration/deceleration of the vehicle. Here, the automatic transmission is a stepwise variable automatic transmission capable of setting a plurality of gear positions, the controller (100) includes a traveling control unit (120) configured to output a traveling control command value including at least a command value of the driving force of the vehicle, and if the driver operates the operation member (70, 72) while the vehicle is traveling under the automated drive control, the traveling control unit (120) performs override control in which the acceleration/deceleration of the vehicle (1) is controlled according to the operation of the operation member (70, 72) when an automated drive target gear position selected based on automatic control of the acceleration/deceleration of the vehicle equals a manual drive target gear position determined according to the operation of the operation member (70, 72) by the driver.

According to the vehicle controller according to the present disclosure, in another aspect, if the driver operates the operation member (70, 72) while the vehicle is driving under the automated drive control, the override control is performed in which the acceleration/deceleration of the vehicle starts to be controlled according to the operation of the operation member when the automated drive target gear position equals the manual drive target gear position. Thus, in adjustment of the acceleration or the deceleration of the vehicle through the operation of the operation member (accelerator pedal or brake pedal, or the like) performed by the vehicle driver while the vehicle is accelerating or decelerating under the automated drive control, the acceleration or the deceleration of the vehicle can be easily adjusted to the acceleration or the deceleration previously set in the automated drive mode. Therefore, it is possible to achieve a smooth shift of the acceleration or the deceleration of the vehicle if the driver operates (overrides) the operation member under execution of the automated drive control.

In another embodiment, a vehicle controller (100) is capable of switchably performing automated drive control and manual drive control, the automated drive control automatically controlling at least acceleration/deceleration out of steering and the acceleration/deceleration of a vehicle (1), the manual drive control controlling at least the acceleration/deceleration out of the steering and the acceleration/deceleration of the vehicle (1) according to an operation of a driver. Here, the vehicle (1) includes: an automatic transmission (TM) configured to vary a speed of a rotation caused by a driving force transmitted from a driving source (EG) and output the rotation to a drive wheel side; and an operation member (70, 72) with which the driver performs an operation to change the acceleration/deceleration of the vehicle, the automatic transmission is a stepwise variable automatic transmission capable of setting a plurality of gear positions, the controller (100) includes a traveling control unit (120) configured to output a traveling control command value including at least a command value of the driving force of the vehicle, and if an automated drive release request to release the automated drive control and switch to the manual drive control is made while the vehicle is traveling under the automated drive control, the traveling control unit (120) performs automated drive/manual drive switch control that releases the automated drive control and switches to the manual drive control when an automated drive target gear position selected based on automatic control of the acceleration/deceleration of the vehicle equals a manual drive target gear position determined according to the operation of the operation member by the driver.

With the vehicle controller according to the present disclosure, if the automated drive release request is made, the automated drive/manual drive switch control is performed in which the automated drive control is released when the automated drive target gear position equals the manual drive target gear position. Thus, even if the switch to the manual drive control occurs while the vehicle is accelerating or decelerating under the automated drive control, the acceleration or the deceleration of the vehicle is changed through the operation of the operation member (such as an accelerator pedal or a brake pedal) performed by the vehicle driver such that the acceleration or the deceleration of the vehicle can be easily adjusted to the acceleration or the deceleration set in the previous automated drive control. Therefore, it is possible to achieve a smooth shift of the acceleration or the deceleration of the vehicle when switching from the automated drive control to the manual drive control.

In addition, in the vehicle controller according to the present disclosure, it is preferable that the operation member includes an accelerator operation member (70) for operating an accelerator position of the driving source (EG), and the operation of the operation member by the driver is an operation of the accelerator operation member performed while the vehicle is accelerating under the automated drive control.

More specifically, the accelerator position (driving force) inputted through the operation of the accelerator operation member by the driver is sensed, and the automated drive control is released when the automated drive target gear position which is the gear position selected based on the automated drive control equals the manual drive target gear position which is the gear position determined based on the accelerator position inputted by the driver.

According to this configuration, even if the aforementioned override control or the automated drive/manual drive switch control is performed while the vehicle is travelling with the high driving force such as a case where the vehicle is traveling uphill or on the winding road under the automated drive control, the driver can easily adjust the acceleration of the vehicle by operating the accelerator operation member to the acceleration in the automated drive control. Therefore, it is possible to achieve a smooth shift of the acceleration of the vehicle when the automated drive control switches to the manual drive control.

In addition, in the vehicle controller according to the present disclosure, it is preferable that the operation member includes a brake operation member (72) for operating a braking force of the vehicle, and the operation of the operation member by the driver is an operation of the brake operation member performed while the vehicle is decelerating under the automated drive control.

More specifically, the braking force of the vehicle inputted through the operation of the brake operation member by the driver is sensed, and the automated drive control is released when the automated drive target gear position which is the gear position selected based on the automated drive control equals the manual drive target gear position which is the gear position determined based on a vehicle speed and the accelerator position inputted by the driver.

According to this configuration, even if the aforementioned override control or the automated drive/manual drive switch control is performed while the vehicle is traveling with the high braking force generated such as a case where the vehicle is traveling uphill or on the winding road under the automated drive control, the driver can easily adjust the deceleration of the vehicle by operating the brake operation member to the deceleration in the automated drive control. Therefore, it is possible to achieve a smooth shift of the deceleration of the vehicle when the automated drive control switches to the manual drive control.

In addition, in the vehicle controller according to the present disclosure, it is preferable that the vehicle controller further includes a turning determination unit (14) configured to determine that the vehicle is in a turning state, in which the override control or the automated drive/manual drive switch control is performed if the turning determination unit determines that the vehicle is in the turning state.

With this configuration, the automated drive/manual drive switch control is performed when it is determined that the vehicle is turning (cornering). Thus, it is possible to inhibit any effect of a change in a yaw rate due to the switching of the gear position while the vehicle is turning. Therefore, it is possible to stabilize the behavior of the vehicle when the automated drive control switches to the manual drive control.

In addition, in the vehicle controller according to the present disclosure, it is preferable that the vehicle controller further includes an uphill/downhill traveling determination unit (14) configured to determine that the vehicle is traveling uphill or downhill, in which the manual drive target gear position is a target gear position determined in consideration of an uphill traveling determination/downhill traveling determination made by the uphill/downhill traveling determination unit.

According to this configuration, when the target gear position (manual drive target gear position) of the vehicle is determined according to the operation of the operation member by the driver, a determination is made in consideration of the uphill traveling determination/downhill traveling determination of the vehicle. Thus, when the vehicle is in an uphill traveling state or a downhill traveling state, the target gear position can be set in consideration of the uphill traveling state or the downhill traveling state. Therefore, it is possible to select, as the manual drive target gear position, a more appropriate gear position that corresponds to the actual traveling state of the vehicle.

In addition, in the vehicle controller according to the present disclosure, it is preferable that the vehicle controller further includes a turning determination unit (14) configured to determine that the vehicle is in a turning state, in which if the request to switch from the automated drive control to the manual drive control is made when the turning determination unit makes a turning determination of the vehicle while the vehicle is traveling under the automated drive mode, the manual drive control takes over the turning determination made in the automated drive control and reflects the turning determination in determination of the manual drive target gear position.

If the vehicle in the turning state switches the gear position when the automated drive control switches to the manual drive mode, the yaw rate of the vehicle 1 may change and the behavior may become unstable. In the above configuration, however, the manual drive mode takes over the turning determination made in the automated drive mode and reflects the turning determination in the determination on the manual drive target gear position, and thereby it is possible to effectively inhibit switching of the gear position while the vehicle is turning and to keep the change in the yaw rate of the vehicle small. This makes it possible to stabilize the behavior of the vehicle.

In addition, in the vehicle controller according to the present disclosure, it is preferable that, under the manual drive control, if the gear position is specified through the operation of the driver, the target gear position is switched from the automated drive target gear position set as a starting gear position to the manual drive target gear position even during the turning determination.

In the manual drive, if the gear position is specified through the operation of the driver (for example, an operation of a paddle switch to switch the gear position), the driver wishes to switch the gear position of the automatic transmission to a desired gear position. Therefore, in that case, even during the turning determination, a priority is given to the specification of the gear position through the operation of the driver, so that the target gear position is switched from the automated drive gear position as the starting gear position to the manual drive target gear position, which is the gear position specified through the operation of the driver. This makes it possible to appropriately reflect a driver's intention.

Note that above symbols in parenthesis represent drawing reference numbers of corresponding components in embodiments to be described below. The word "unit" used in this application may mean a physical part or component of computer hardware or any device including a controller, a processor, a memory, etc., which are particularly configured to perform functions and steps disclosed in the application.

According to the vehicle controller according to the present disclosure, if the driver operates (overrides) the operation member such as the accelerator pedal or the brake pedal or makes a request to switch from the automated drive mode to the manual drive mode while the vehicle is traveling under the automated drive control, it is possible to easily adjust the acceleration or the deceleration according to the operation of the operation members by the vehicle driver to the acceleration or the deceleration of the vehicle in the previous automated drive mode, and to achieve a smooth shift of the acceleration or the deceleration.

DESCRIPTION OF THE PREFERRED EMBODIMENTS

Figure 1:
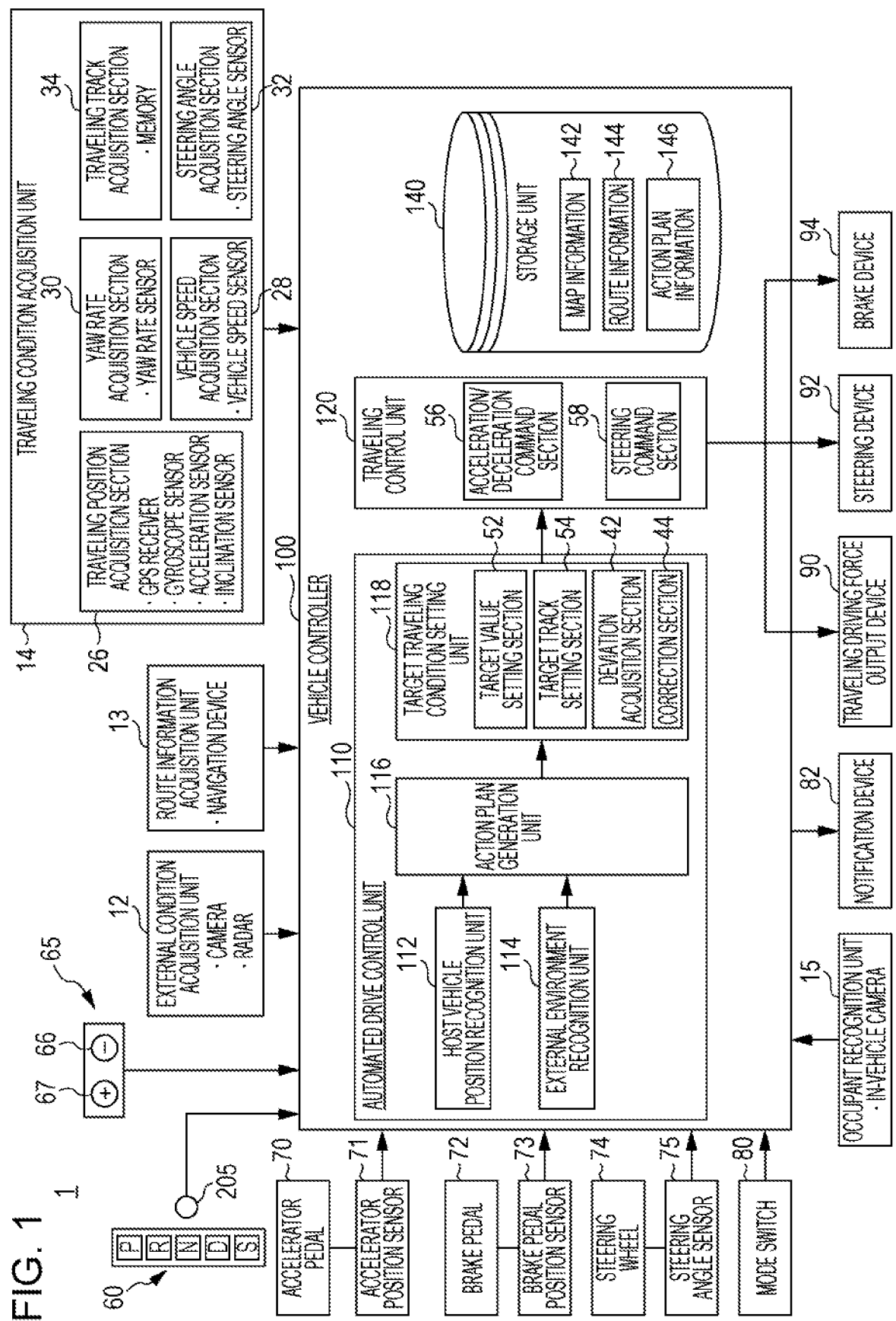
FIG. 1 is a functional configuration diagram of a system of controlling a vehicle including a vehicle controller of an embodiment of the present disclosure.

In the following, embodiments of the present disclosure are described with reference to the accompanying drawings. FIG. 1 is a functional configuration diagram of a system of controlling a vehicle 1 including a controller 100 mounted on the vehicle 1. A configuration of the controller 100 is described, using FIG. 1. The vehicle (host vehicle) 1 on which the controller 100 is mounted is, for example, an automobile such as a two-wheel, three-wheel, or four-wheel vehicle, and includes an automobile powered by an internal-combustion engine such as a diesel engine or a gasoline engine, an electric vehicle powered by an electric motor, a hybrid automobile combining the internal-combustion engine and the electric motor, or the like. In addition, the aforementioned electric vehicle is driven by using electric power discharged by a battery such as a secondary cell, a hydrogen fuel cell, a metal fuel cell, an alcohol fuel cell, or the like.

The controller 100 includes a device, such as an external condition acquisition unit 12, a route information acquisition unit 13, a traveling condition acquisition unit 14, or the like, for capturing various types of information from outside of the vehicle 1. The controller 100 also includes an operating device such as an accelerator pedal 70, a brake pedal 72, a steering wheel 74, and a mode switch 80; an operation detection sensor such as an accelerator position sensor 71, a brake pedal position sensor (brake switch) 73, and a steering angle sensor (or a steering torque sensor) 75; a notification device (output unit) 82; and an occupant recognition unit (in-car camera) 15. In addition, as a device for performing driving or steering of the vehicle 1, the vehicle 1 includes a traveling driving force output device (drive device) 90, a steering device 92, a brake device 94, as well as the controller 100 for controlling them. These devices or instruments are connected with each other via a multiplex communication line such as CAN (Controller Area Network), a serial communication line, a wireless communication network, or the like. Note that the operation devices exemplarily illustrated are merely an example, and that a button, a dial switch, a GUI (Graphical User Interface) switch, or the like may also be mounted on the vehicle 1.

The external condition acquisition unit 12 is configured to acquire environmental information around the vehicle such as external conditions of the vehicle 1, for example, a traffic lane on a traveling road or an object around the vehicle. The external condition acquisition unit 12 includes, for example, various types of cameras (monocular camera, stereo camera, infrared camera, or the like) or various types of radars (millimeter-wave radar, microwave radar, laser radar, or the like). In addition, a fusion sensor that integrates information acquired by a camera with that acquired by a radar can be used.

The route information acquisition unit 13 includes a navigation device. The navigation device has a GNSS (Global Navigation Satellite System) receiver or map information (navigation map), a touch-panel type display device that functions as a user interface, a speaker, a microphone, or the like. The navigation device identifies a position of the vehicle 1 by the GNSS receiver, and derives from that position a route to a destination specified by a user. The route derived by the navigation device is stored as route information 144 in a storage unit 140. The position of the vehicle 1 may be identified or complemented by an INS (Inertial Navigation System) that uses output from the traveling condition acquisition unit 14. The navigation device also gives a guidance on the route leading to the destination by voice or through navigation display when the controller 100 is performing a manual drive mode. Note that a configuration for identifying the position of the vehicle 1 may be provided independently of the navigation device. The navigation device may also be implemented by a function of terminal equipment such as a smart phone or a tablet terminal held by the user. In this case, information is transmitted and received between the terminal equipment and the controller 100 via wireless or wired communications.

The traveling condition acquisition unit 14 is configured to acquire a current traveling condition of the vehicle 1. The traveling condition acquisition unit 14 includes a traveling position acquisition section 26, a vehicle speed acquisition section 28, a yaw rate acquisition section 30, a steering angle acquisition section 32, and a traveling track acquisition section 34. The traveling condition acquisition unit 14 functions as a turning determination unit or an uphill/downhill traveling determination unit in override control or automated drive/manual drive switch control, to be described below, the turning determination unit determining that the vehicle is in a turning state, and the uphill/downhill traveling determination unit determining whether the vehicle is traveling uphill or downhill.

The traveling position acquisition section 26 is configured to acquire a traveling position and posture of the vehicle 1 (direction of movement), which is one of the traveling conditions. The traveling position acquisition section 26 includes various types of positioning devices such as a device (GPS receiver, GNSS receiver, beacon receiver, or the like) that receives an electromagnetic wave transmitted from a satellite or a road device, for example, to acquire positional information (latitude, longitude, altitude, coordinates, or the like), or a gyroscope sensor, an acceleration sensor, or an inclination sensor, or the like. The traveling position of the vehicle 1 is measured based on a specific region of the vehicle 1.

The vehicle speed acquisition section 28 is configured to acquire a speed of the vehicle 1 (referred to as a vehicle speed), which is one of the traveling conditions. The vehicle speed acquisition section 28 includes a vehicle speed sensor, or the like, provided on one or more wheels, for example.

The yaw rate acquisition section 30 is configured to acquire a yaw rate of the vehicle 1, which is one of the traveling conditions. The yaw rate acquisition section 30 includes a yaw rate sensor, or the like, for example.

The steering angle acquisition section 32 is configured to acquire a steering angle, which is one of the traveling conditions. The steering angle acquisition section 32 includes a steering angle sensor, or the like, provided on a steering shaft, for example. Here, a steering angle speed and steering angle acceleration are also acquired based on the acquired steering angle.

The traveling track acquisition section 34 is configured to acquire information on an actual traveling track (actual traveling track) of the vehicle 1, which is one of the traveling conditions. The actual traveling track includes a track (trajectory) on which the vehicle 1 actually traveled and may include a scheduled track on which the vehicle will travel from now, for example, an extension line on the front side of the direction of movement of the travelled track (trajectory). The traveling track acquisition section 34 includes a memory. The memory stores the positional information of a series of dot sequences included in the actual traveling track. In addition, the extension line can be predicted by a computer, or the like.

The accelerator position sensor 71, the brake pedal position sensor 73, the steering angle sensor 75, which are the operation detection sensor, output to the controller 100 accelerator position, a brake pedal position, and the steering angle as a detection result.

The mode switch 80 is a switch to be operated by an occupant of the vehicle 1. The mode switch 80 receives an operation of the occupant, and switches a drive mode (for example, an automated drive mode and the manual drive mode) based on content of the received operation. For example, from the content of the operation of the occupant, the mode switch 80 generates a drive mode specification signal that specifies the drive mode of the vehicle 1, and outputs it to the controller 100.

In addition, the vehicle 1 of the embodiment includes a shift device 60 to be operated by the driver via a shift lever. As shown in FIG. 1, positions of the shift lever (not shown) in the shift device 60 include P (parking), R (reverse travel), N (neutral), D (advance travel in an automatic gear shift mode (normal mode)), S (advance travel in a sports mode), or the like. A shift position sensor 205 is provided in the vicinity of the shift device 60. The shift position sensor 205 detects a position of the shift lever to be operated by the driver. Information on a shift position detected by the shift position sensor 205 is inputted to the controller 100. Note that in the manual drive mode, the information on the shift position detected by the shift position sensor 205 is directly outputted to a traveling driving force output device 90 (AT-ECU5).

In addition, the vehicle 1 of the present disclosure includes a paddle switch 65 provided in the vicinity of the steering wheel 74. The paddle switch 65 includes a− switch (minus button) 66 for instructing shift-down in a manual gear shift mode during the manual drive (manual drive mode) and a+ switch (plus button) 67 for instructing shift-up in the manual gear shift mode. In the manual gear shift mode (manual mode) of an automatic transmission TM in the manual drive mode, operation signals of these minus button 66 and plus button 67 are outputted to the controller 100, and up-shift or down-shift of a gear position set by the automatic transmission TM according to the traveling condition of the vehicle 1 is performed. Note that in the embodiment, during the manual drive, if the driver operates any of the minus button 66 and the plus button 67 when the automatic gear shift mode is set and the shift lever is positioned in a D range or an S range, the automatic gear shift mode is switched to the manual gear shift mode (manual mode).

The notification device 82 is various types of devices capable of outputting information. The notification device 82 outputs information for prompting the occupant of the vehicle 1 to shift from the automated drive mode to the manual drive mode. As the notification device 82, at least one of the speaker, a vibrator, the display device, and a light-emitting device, or the like, for example, is used.

The occupant recognition unit 15 includes the in-car camera capable of imaging interior of a passenger compartment of the vehicle 1, for example. The in-car camera may be, for example, a digital camera utilizing an individual image pickup device such as a CCD or a CMOS, or a near-infrared camera combined with a near-infrared light source. The controller 100 acquires an image shot by the in-car camera and can recognize a current driver of the vehicle 1 from an image of a face of the driver of the vehicle 1 included in the image.

Figure 2:
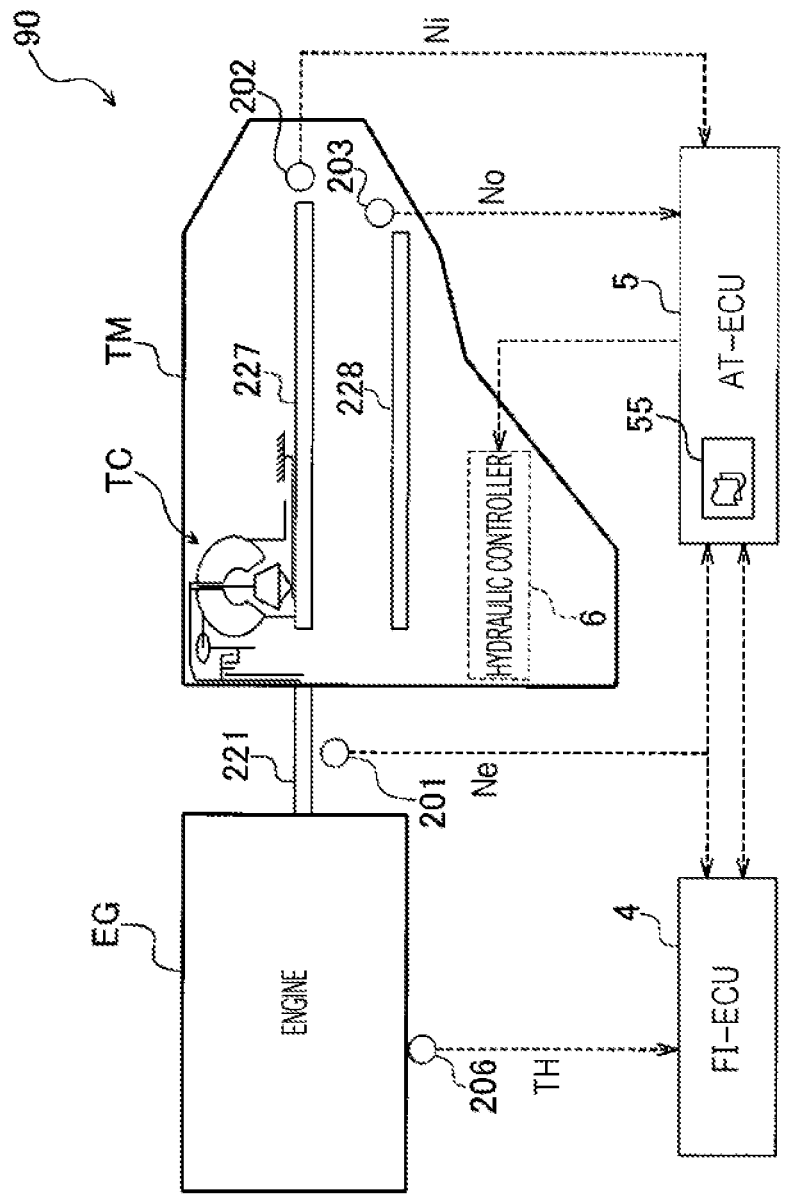
FIG. 2 is a schematic diagram illustrating a configuration of a traveling driving force output device (drive device) of the vehicle.

In the vehicle 1 of the embodiment, as shown in FIG. 2, the traveling driving force output device (drive device) 90 includes an engine EG, an FI-ECU (Electronic Control Unit) 4 that controls the engine EG, the automatic transmission TM, and the AT-ECU5 that controls the automatic transmission TM. Note that in addition to them, the traveling driving force output device 90 may also include a traction motor and a motor ECU that controls the traction motor, if the vehicle 1 is the electric vehicle powered by the electric motor. The traveling driving force output device 90 may also include the engine, the engine ECU, the traction motor, and the motor ECU, if the vehicle 1 is the hybrid automobile. If the traveling driving force output device 90 includes the engine EG and the automatic transmission TM, as in this embodiment, the FI-ECU 4 and the AT-ECU 5 control a throttle position of the engine EG or shift position of the automatic transmission TM, or the like, following information inputted from a traveling control unit 120, to be described below, and outputs traveling driving force (torque) for the vehicle 1 to travel. In addition, if the traveling driving force output device 90 includes the traction motor only, the motor ECU adjusts a duty ratio of a PWM signal to be provided to the traction motor, according to the information inputted from the traveling control unit 120, and outputs the aforementioned traveling driving force. In addition, the traveling driving force output device 90 includes the engine and the traction motor, both the FI-ECU and the motor ECU cooperate with each other to control the traveling driving force, according to the information inputted from the traveling control unit 120.

The steering device 92 includes the electric motor, for example. The electric motor causes a force to act on a rack-and-pinion mechanism to change orientation of a turning wheel. The steering device 92 drives the electric motor according to the information inputted from the traveling control unit 120 to change the orientation of the turning wheel.

The brake device 94 is an electric brake device including, for example, a brake caliper, a cylinder transmitting hydraulic pressure to the brake caliper, the electric motor for generating the hydraulic pressure in the cylinder, and a braking control unit. The braking control unit of the electric servo brake device controls the electric motor according to the information inputted from the traveling control unit 120, so that brake torque (braking force output device) that outputs a braking force according to a braking operation is outputted to each wheel. The electric servo brake device may include, as a backup, a mechanism for conveying the hydraulic pressure generated through the operation of the brake pedal 72 to the cylinder via a master cylinder. Note that the brake device 94 is not limited to the electric servo brake device as described above, and may be an electronically controlled brake device. The electronically controlled brake device controls an actuator according to the information inputted from the traveling control unit 120, and conveys the hydraulic pressure of the master cylinder to the cylinder. In addition, if the traveling driving force output device 90 includes the traction motor, the brake device 94 may include a regeneration brake by the traction motor.

Next, the controller 100 is described. The controller 100 includes an automated drive control unit 110, the traveling control unit 120, and the storage unit 140. The automated drive control unit 110 includes a host vehicle position recognition unit 112, an external environment recognition unit 114, an action plan generation unit 116, and a target traveling condition setting unit 118. Each unit of the automated drive control unit 110 and some or all of the traveling control unit 120 are implemented by a processor such as a CPU (Central Processing Unit), or the like executing a program. Some or all of them may also be implemented by hardware such as an LSI (Large Scale Integration) or an ASIC (Application Specific Integrated Circuit). In addition, the storage unit 140 is implemented by a ROM (Read Only Memory), a RAM (Random Access Memory), an HDD (Hard Disk Drive), or a flash memory, or the like. The program executed by the processor may be stored in advance in the storage unit 140 or downloaded from an external device via an onboard Internet equipment, or the like. The program may also be installed in the storage unit 140 by a portable storage medium which stores that program being attached to a drive device (not shown). In addition, the controller 100 may be distributed to a plurality of computer devices. This allows the aforementioned hardware functional units and software including the program, or the like, to work together on the on-board computer of the vehicle 1 to implement various types of processing in the embodiment.

The automated drive control unit 110 switches the drive mode according to input of the signal from the mode switch 80 to perform the control. The drive mode includes the drive mode (automated drive mode) that automatically controls acceleration/deceleration and steering of the vehicle 1, or the drive mode (manual drive mode) that controls the acceleration/deceleration of the vehicle 1 according to an operation on the operating device such as the accelerator pedal 70 or the brake pedal 72 and controls the steering according to the operation on the operating device such as the steering wheel 74, or the like. However, the drive mode is not limited thereto. Other drive modes may also include the drive mode (semi-automated drive mode) that automatically controls one of the acceleration/deceleration and the steering of the vehicle 1 and controls the other according to the operation on the operating device. Note that in the following description, "automated drive" includes the semi-automated drive mode, in addition to the automated drive mode described above.

Incidentally, under execution of the manual drive mode, the automated drive control unit 110 may stop the operation so that an input signal from the operation detection sensor is outputted to the traveling control unit 120 or directly supplied to the traveling driving force output device 90 (FI-ECU or AT-ECU), the steering device 92, or the brake device 94.

The host vehicle position recognition unit 112 of the automated drive control unit 110 recognizes the traffic lane (traveling lane) on which the vehicle 1 is traveling and a relative position of the vehicle 1 to the traveling lane, based on the map information 142 stored in the storage unit 140 and information inputted from the external condition acquisition unit 12, the route information acquisition unit 13, or the traveling condition acquisition unit 14. The map information 142 is, for example, the map information of higher precision than the navigation map the route information acquisition unit 13 has, and includes information on the center of the traffic lane or information on a border of the traffic lane. To be more specific, the map information 142 includes road information, traffic regulation information, address information (address/postal code), facility information, telephone number information, or the like. The road information includes information on a road type such as an expressway, a toll road, a national road, or a prefectural road, and information on the number of traffic lanes, width of each traffic lane, road inclination, a road position (three-dimensional coordinate including longitude, latitude, and altitude), curvature of a traffic lane curve, positions of merging and branching points of the traffic lane, signs provided on the road, or the like. The traffic regulation information includes information on traffic lane being blocked due to roadwork or a traffic accident, traffic jams, or the like.

The host vehicle position recognition unit 112 recognizes, as the relative position of the vehicle 1 to the traveling lane, deviation of a benchmark (center of gravity, for example) of the vehicle 1 from the center of the traveling lane, and an angle made to a centerline of the traveling lane in the direction of movement of the vehicle 1. Note that instead of this, the host vehicle position recognition unit 112 may recognize, as the relative position of the vehicle 1 to the traveling lane, apposition of the benchmark of the vehicle 1 to any side edge part of an own traffic lane.

The external environment recognition unit 114 recognizes such conditions as a position, a speed, acceleration, or the like of a surrounding vehicle, based on the information inputted from the external condition acquisition unit 12. The surrounding vehicle referred in this embodiment is other vehicle that travels around the vehicle 1, and the vehicle that travels in a same direction as the vehicle 1 does. The position of the surrounding vehicle may be represented by a representative point such as the center of gravity of the vehicle 1 or a corner, or may be represented by an area expressed by an outline of the vehicle 1. The "conditions" of the surrounding vehicle may include the acceleration of the surrounding vehicle, and whether or not it is changing the traffic lane (or is trying to change the traffic lane). In addition, the external environment recognition unit 114 may also recognize a position of a guardrail, a power pole, a parked vehicle, a passenger, or other object, in addition to the surrounding vehicle.

The action plan generation unit 116 sets a starting point of the automated drive, a scheduled end point of the automated drive, and/or a destination of the automated drive. The starting point of the automated drive may be a current position of the vehicle 1 or a spot where the occupant of the vehicle 1 performs an operation to instruct the automated drive. The action plan generation unit 116 generates an action plan in a section between the starting point and the scheduled end point or in a section between the starting point and the destination of the automated drive. Note that the action plan generation unit 116 is not limited thereto and may generate the action plan for any section.

The action plan may include a plurality of events that are sequentially performed, for example. The events include a deceleration event that decelerates the vehicle 1, an acceleration event that accelerates the vehicle 1, a lane-keep event that causes the vehicle 1 to travel so as not to deviate from the traveling lane, a lane-change event that changes the traveling lane, an overtake-event that causes the vehicle 1 to overtake a front traveling vehicle, a branch event that causes the vehicle 1 to change to a desired traffic lane at a branch point or to travel so as not to deviate from the current traveling lane, a merging event that causes the vehicle 1 to accelerate/decelerate in a merging lane for merging to a main lane and to change the traveling lane, or the like. For example, there exists a junction (branch point) in the toll road (expressway, or the like, for example), the controller 100 changes or keeps the traffic lane so that the vehicle 1 moves in a direction toward the destination. Therefore, if the action plan generation unit 116 refers to the map information 142 and finds out that the junction is present on the route, from the current position (coordinate) of the vehicle 1 till the position (coordinate) of the junction, the action plan generation unit 116 sets the lane-change event for changing the traffic line to a desired traffic lane on which the vehicle 1 can move to the direction toward the destination. Note that information showing the action plan generated by the action plan generation unit 116 is stored as action plan information 146 in the storage unit 140.

The target traveling condition setting unit 118 is configured to set a target traveling condition, which is a traveling condition targeted by the vehicle 1, based on the action plan determined by the action plan generation unit 116, and various types of information acquired from the external condition acquisition unit 12, the route information acquisition unit 13, and the traveling condition acquisition unit 14. The target traveling condition setting unit 118 includes a target value setting section 52 and a target track setting section 54. The target traveling condition setting unit 118 also includes a deviation acquisition section 42 and a correction section 44.

The target value setting section 52 is configured to set information on the traveling position (latitude, longitude, altitude, coordinates, or the like) targeted by the vehicle 1, information on a target value of the vehicle speed (which may be simply referred to as a target vehicle speed), and information on a target value of the yaw rate (which may be simply referred to as a target yaw rate). The target track setting section 54 is configured to set information on a target track of the vehicle 1 (which may be simply referred to as a target track) based on the external conditions acquired by the external condition acquisition unit 12 and the traveling route information acquired by the route information acquisition unit 13. The target track includes information on the target position per unit time. Each target position is associated with posture information (direction of movement) of the vehicle 1. In addition, each target position may be associated with the target value information such as the vehicle speed, the acceleration, the yaw rate, lateral acceleration G, the steering angle, steering angular speed, steering angular acceleration, or the like. The aforementioned target position, target vehicle speed, target yaw rate, and target track are information showing the target traveling condition.

The deviation acquisition section 42 is configured to acquire a deviation of an actual traveling condition to the target traveling condition, based on the target traveling condition set by the target traveling condition setting unit 118 and the actual traveling condition acquired by the traveling condition acquisition unit 14.

The correction section 44 is configured to correct the target traveling condition according to a deviation acquired by the deviation acquisition section 42. Specifically, as the deviation increases, the correction section 44 brings the target traveling condition set by the target traveling condition setting unit 118 close to the actual traveling condition acquired by the traveling condition acquisition unit 14 and sets a new target traveling condition.

The traveling control unit 120 is configured to control traveling of the vehicle 1. Specifically, the traveling control unit 120 outputs a command value for traveling control so that the traveling condition of the vehicle 1 equals or is brought close to the target traveling condition set by the target traveling condition setting unit 118 or the new target traveling condition set by the correction section 44. The traveling control unit 120 includes an acceleration/deceleration command section 56 and a steering command section 58.

The acceleration/deceleration command section 56 is configured to perform acceleration/deceleration control of the traveling control of the vehicle 1. Specifically, the acceleration/deceleration command section 56 computes an acceleration/deceleration command value so as to make the traveling condition of the vehicle 1 equal the target traveling condition, based on the target traveling condition (target acceleration/deceleration) and the actual traveling condition (actual acceleration/deceleration) which are set by the target traveling condition setting unit 118 or the correction section 44.

The steering command section 58 is configured to perform the steering control of the traveling control of the vehicle 1. Specifically, the steering command section 58 computes a steering angular speed command value so as to make the traveling condition of the vehicle 1 equal the target traveling condition, based on the target traveling condition and the actual traveling condition which are set by the target traveling condition setting unit 118 or the correction section 44.

FIG. 2 is a schematic diagram illustrating a configuration of the traveling driving force output device (drive device) 90 that the vehicle 1 includes. As shown in FIG. 2, the traveling driving force output device 90 of the vehicle 1 of the embodiment includes the internal-combustion engine (engine) EG, which is the driving source, and the automatic transmission TM connected to the engine EG via a torque converter TC with a lockup clutch. The automatic transmission TM is a transmission that varies the speed of the rotation caused by the driving force transmitted from the engine EG to output it to a drive wheel side, and is a stepwise variable automatic transmission capable of setting a plurality of gear positions for forward traveling and one gear position for reverse traveling. In addition, the traveling driving force output device 90 includes the FI-ECU (fuel injection controller) 4 that electronically controls the engine EG; the AT-ECU (automatic gear shift controller) 5 that automatically controls the automatic transmission TM including the torque converter TC; and a hydraulic controller 6 that hydraulically controls rotation driving or lockup control of the torque converter TC according to the control of AT-ECU5 and fastening (engagement)/release of a plurality of friction engagement mechanisms included in the automatic transmission TM.

Rotation output of the engine EG is outputted to a crankshaft (output shaft of the engine EG) 221, and conveyed to an input shaft 227 of the automatic transmission TM via the torque converter TC.

A crankshaft rotation speed sensor 201 for detecting a rotation speed Ne of the crankshaft 221 (engine EG) is provided. In addition, an input shaft rotation speed sensor 202 for detecting a rotation speed Ni of the input shaft 227 (input shaft rotation speed of the automatic transmission TM) is provided. In addition, an output shaft rotation speed sensor 203 for detecting a rotation speed No of the output shaft 228 (output shaft rotation speed of the automatic transmission TM) is provided. Vehicle speed data calculated from the rotation speed data Ne, Ni, No, and No detected by the respective sensors 201 to 203 is provided to the AT-ECU5. The engine rotation speed data Ne is also provided to the FI-ECU (fuel injection controller) 4. In addition, a throttle position sensor 206 for detecting throttle position TH of the engine EG is provided. Data on the throttle position TH is provided to the FI-ECU4.

In addition, AT-ECU 5 that controls the automatic transmission TM has a shift map (gear shift characteristics) 55 that defines areas for the gear positions settable by the automatic transmission TM, according to the vehicle speed detected by the vehicle speed sensor and the accelerator position detected by the accelerator position sensor 71. The shift map 55 includes an upshift line and downshift line set for each of the gear positions, and a plurality of types of shift maps having different characteristics are prepared in advance. In the gear shift control of the automatic transmission TM, the AT-ECU5 performs control to switch the gear positions of the automatic transmission TM according to the shift map selected from the plurality of types of shift maps.

In addition, in the vehicle 1 of the embodiment, a determination based on the information of the traveling condition acquisition unit 14 that the vehicle 1 is traveling uphill or downhill is used in PRO SMATEC control. The PRO SMATEC control is control that makes a correction to a shift control map for a flat road according to a traveling condition, and changes a gear shift schedule. Smooth traveling is possible by, for example, appropriately changing a gear shift point of the shift-up or the shift-down according to uphill inclination or downhill inclination.

[Overview of Manual Drive Control]

In the vehicle 1, if the manual drive mode is selected, conventional control of the vehicle 1 (control of acceleration/deceleration and steering) according to the operation of the driver without going through the automated drive control unit 110 is performed. In the manual drive mode, detection information detected of the accelerator position sensor 71, which is the operation detection sensor, is directly inputted to the FI-ECU4 or the AT-ECU5 of the traveling driving force output device 90. The FI-ECU4 or the AT-ECU5 controls the engine EG and the automatic transmission TM (hydraulic controller 6) based on the detection information. In addition, the brake device 94 is controlled based on detection information of the brake pedal position sensor 73. With these, the acceleration/deceleration of the vehicle is controlled. In addition, the steering device 92 is controlled based on detection information of the steering angle sensor 75. With this, the steering of the vehicle is performed.

[Overview of Automated Drive Control]

In the vehicle 1, if the automated drive mode is selected through the operation of the mode switch 80 by the driver, the automated drive control unit 110 performs the automated drive control of the vehicle 1. In the automated drive control, the automated drive control unit 110 understands the current traveling condition (actual traveling track or traveling position, or the like) of the vehicle 1 based on the information acquired from the external condition acquisition unit 12, the route information acquisition unit 13, the traveling condition acquisition unit 14, or the like, or the information recognized by the host vehicle position recognition unit 112 and the external environment recognition unit 114. The target traveling condition setting unit 118 sets the target traveling condition (target track or target position), which is the traveling condition targeted by the vehicle 1, based on the action plan generated by the action plan generation unit 116. The deviation acquisition section 42 acquires the deviation of the actual traveling condition relative to the target traveling condition. The traveling control unit 120 performs the traveling control so as to make the traveling condition of the vehicle 1 equal the target traveling condition or bring the traveling condition of the vehicle 1 close to the target traveling condition, if the deviation is acquired by the deviation acquisition section 42.

The correction section 44 corrects the target track or the target position based on the traveling position acquired by the traveling position acquisition section 26. The traveling control unit 120 performs the acceleration/deceleration control of the vehicle 1 by the traveling driving force output device 90 and the brake device 94, based on the vehicle speed, or the like, acquired by the vehicle speed acquisition section, so that the vehicle 1 follows a new target track or a new target position.

In addition, the correction section 44 corrects the target track based on the traveling position acquired by the traveling position acquisition section 26. The traveling control unit 120 controls the steering by the steering device 92, based on the steering angular speed acquired by the steering angle acquisition section 32, so that the vehicle 1 follows the new target track.

[Override Control/Drive Mode Switching Control]

Then, when the driver operates (overrides) the operation member such as the accelerator pedal 70 or the brake pedal 72 or makes the automated drive release request to release the automated drive mode and switch to the manual drive mode while the vehicle 1 is traveling under the automated drive mode (including during temporary parking, or the like), the controller 100 of the vehicle 1 of the embodiment starts control of the acceleration/deceleration of the vehicle according to the operation of the accelerator pedal 70 or the brake pedal 72 (hereinafter referred to as "override control") or performs control to release the automated drive mode and switch to the manual drive mode (hereinafter referred to as "drive mode switch control") when the target gear position (automated drive target gear position) that is selected based on the automatic control of the acceleration/deceleration of the vehicle equals the target gear position (manual drive target gear position) that is determined according to the operation of the accelerator pedal 70 or the brake pedal 72 by the driver. In the following, the override control and the drive mode switch control are described.

Figure 3:
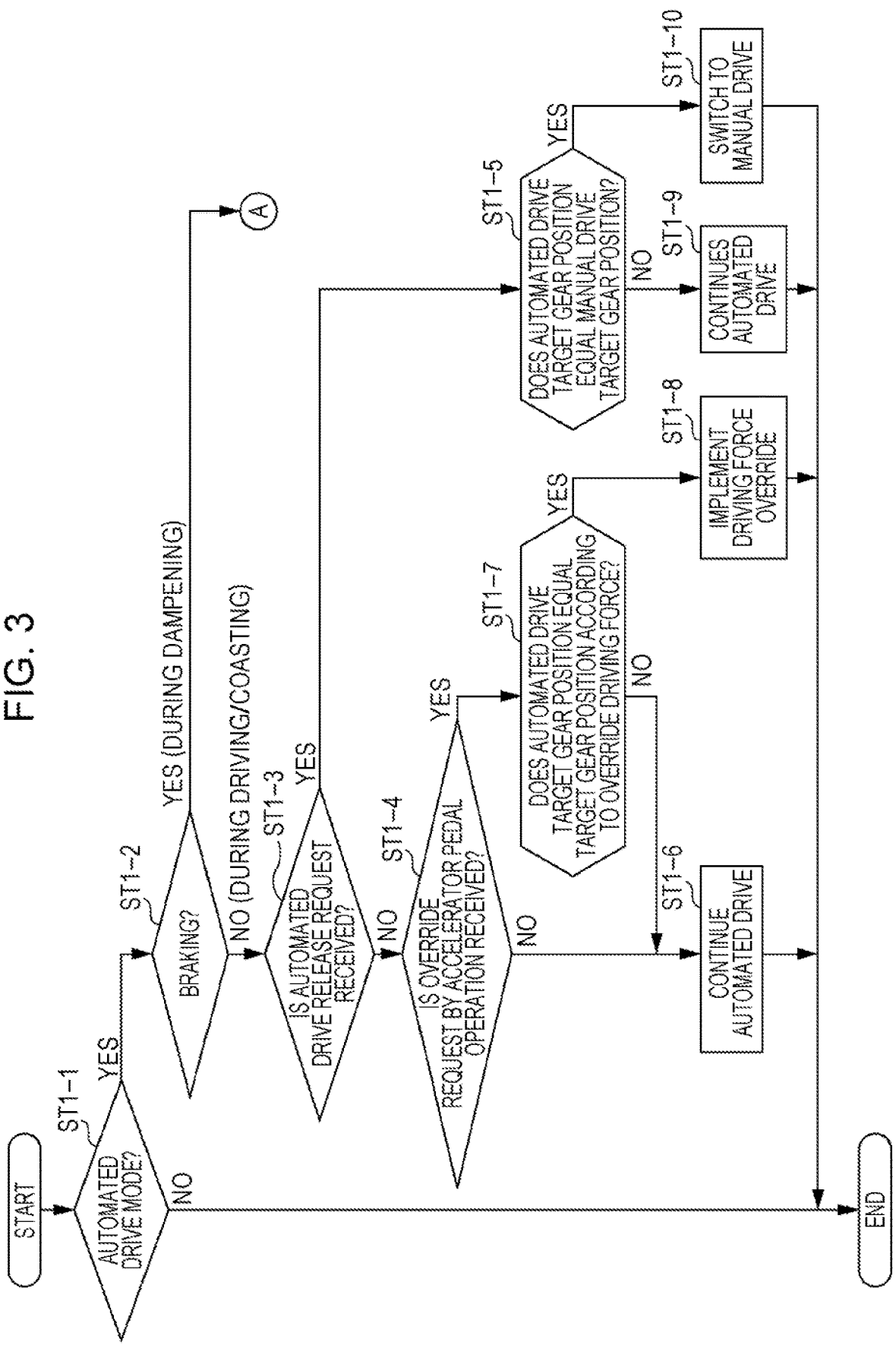
FIG. 3 is a flowchart for illustrating a procedure of override control and drive mode switch control.
Figure 4:
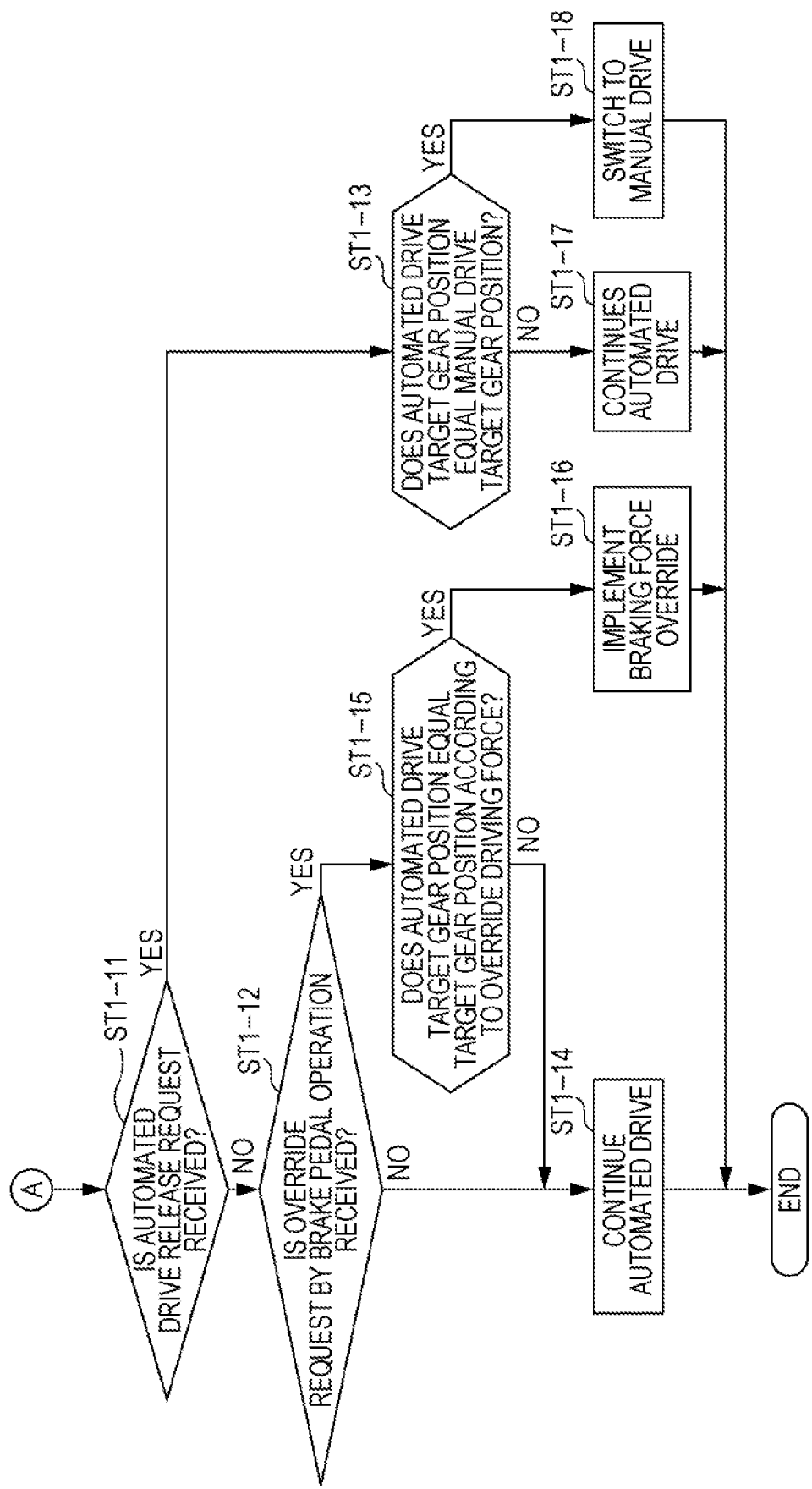
FIG. 4 is a flowchart for illustrating the procedure of the override control and the drive mode switch control.

FIGS. 3 and 4 are flowcharts for illustrating procedures of the override control and the drive mode switch control as described above. The procedures of the override control and the drive mode switch control are hereinafter described along the flowcharts. Here, first, it is determined whether or not the drive mode of the vehicle 1 is the automated drive mode (under execution of the automated drive control) (ST1-1). As a result, if it is not the automated drive mode (NO), processing just ends. On the other hand, if it is the automated drive mode (YES), it is subsequently determined whether or not the vehicle 1 is in a braking drive state (braking) (ST1-2). As a result, if the vehicle 1 is not braking (NO), more specifically, if the vehicle 1 is in a drive traveling condition or in a coast (inertia) traveling condition (driving/coasting), the processing proceeds to and ST1-3. If the vehicle 1 is braking (YES), the processing (FIG. 4) proceeds to and after ST1-11 in FIG. 4.

In ST1-3, it is determined whether or not a release request of the automated drive mode is made (automated drive release request). Here, the automated drive release request is a request from the driver of the vehicle 1 or from the system, the request being to release the automated drive mode of the vehicle 1 and switch to the manual drive mode. Specifically, based on occurrence of a request to switch to the manual drive mode from the system of the vehicle 1 according to the traveling condition of the vehicle 1 during the control in the automated drive mode, occurrence of the switch request from the automated drive mode to the manual drive mode as a result of the operation of the mode switch 80 by the driver, or the like, it is determined that the automated drive release request is made. As a result, if there is no release request of the automated drive mode (NO), the processing proceeds to ST1-4. If there is the release request of the automated drive mode (YES), the processing proceeds to ST1-5. In ST1-4, it is determined whether or not the driver has operated the accelerator pedal 70 (override request by the operation of the accelerator pedal 70). As a result, if the driver has not operated the accelerator pedal 70 (NO), the automated drive mode continues (ST1-6). On the other hand, if the driver has operated the accelerator pedal 70 (YES), it is subsequently determined whether or not the automated drive target gear position equals the target gear position based on the driving force of the operation (override) of the accelerator pedal 70 by the driver (ST1-7). As a result, if the automated drive target gear position does not equal the target gear position based on the driving force of the operation (target gear position by the override driving force) of the accelerator pedal 70 by the driver (NO), the automated drive mode continues (ST1-6). On the other hand, if the automated drive target gear position equals the target gear position based on the driving force of the operation of the accelerator pedal 70 by the driver (YES), the control (override control of the driving force) is performed in which the target gear position of the automatic transmission TM is adjusted to the target gear position according to the operation of the accelerator pedal 70 by the driver (ST1-8). In addition, if the automated drive mode release request is made in the aforementioned ST1-3 (YES), it is subsequently determined whether or not the automated drive target gear position equals the target gear position (manual drive target gear position) according to the operation of the accelerator pedal 70 by the driver (ST1-5). As a result, if the automated drive target gear position does not equal the manual drive target gear position (NO), the automated drive mode continues (ST1-9). On the other hand, if the automated drive target gear position equals the manual drive target gear position (YES), the switch to the manual drive mode is performed (ST1-10).

In addition, if the vehicle 1 is braking in the aforementioned ST1-2 (YES), the processing proceeds to ST1-11 in FIG. 4 where it is determined whether or not the automated drive release request is made. As a result, if no automated drive release request is made (NO), the processing proceeds to ST1-12. If the automated drive release request is made (YES), the processing proceeds to ST1-13. In ST1-12, it is determined whether or not the driver has operated the brake pedal 72 (override request from the operation of the brake pedal 72). As a result, if the driver has not operated the brake pedal 72 (NO), the automated drive mode continues (ST1-14). On the other hand, if the driver has operated the brake pedal 72 (YES), it is subsequently determined whether or not the automated drive target gear position equals the target gear position based on the braking force of the operation of the brake pedal 72 by the driver (braking force of the override) (ST1-15). As a result, if the automated drive target gear position does not equal the target gear position (target gear position resulting from the braking force of override) based on the braking force of the operation of the brake pedal 72 by the driver (NO), the automated drive mode continues (ST1-14). On the other hand, if the automated drive target gear position equals the target gear position based on the braking force of the operation of the brake pedal 72 of the driver (YES), the control (override control of the braking force) is performed in which the target gear position of the automatic transmission TM is adjusted to the target gear position based on the braking force of the operation of the brake pedal 72 by the driver (ST1-16). In addition, if the automated drive release request is made in the aforementioned ST1-11 (YES), it is subsequently determined whether or not the automated drive target gear position equals the manual drive target gear position (ST1-13). As a result, if the automated drive target gear position does not equal the manual drive target gear position (NO), the automated drive mode continues (ST1-17). On the other hand, if the automated drive target gear position equals the manual drive target gear position (YES), the switch to the manual drive mode is performed (ST1-18).

Figure 5:
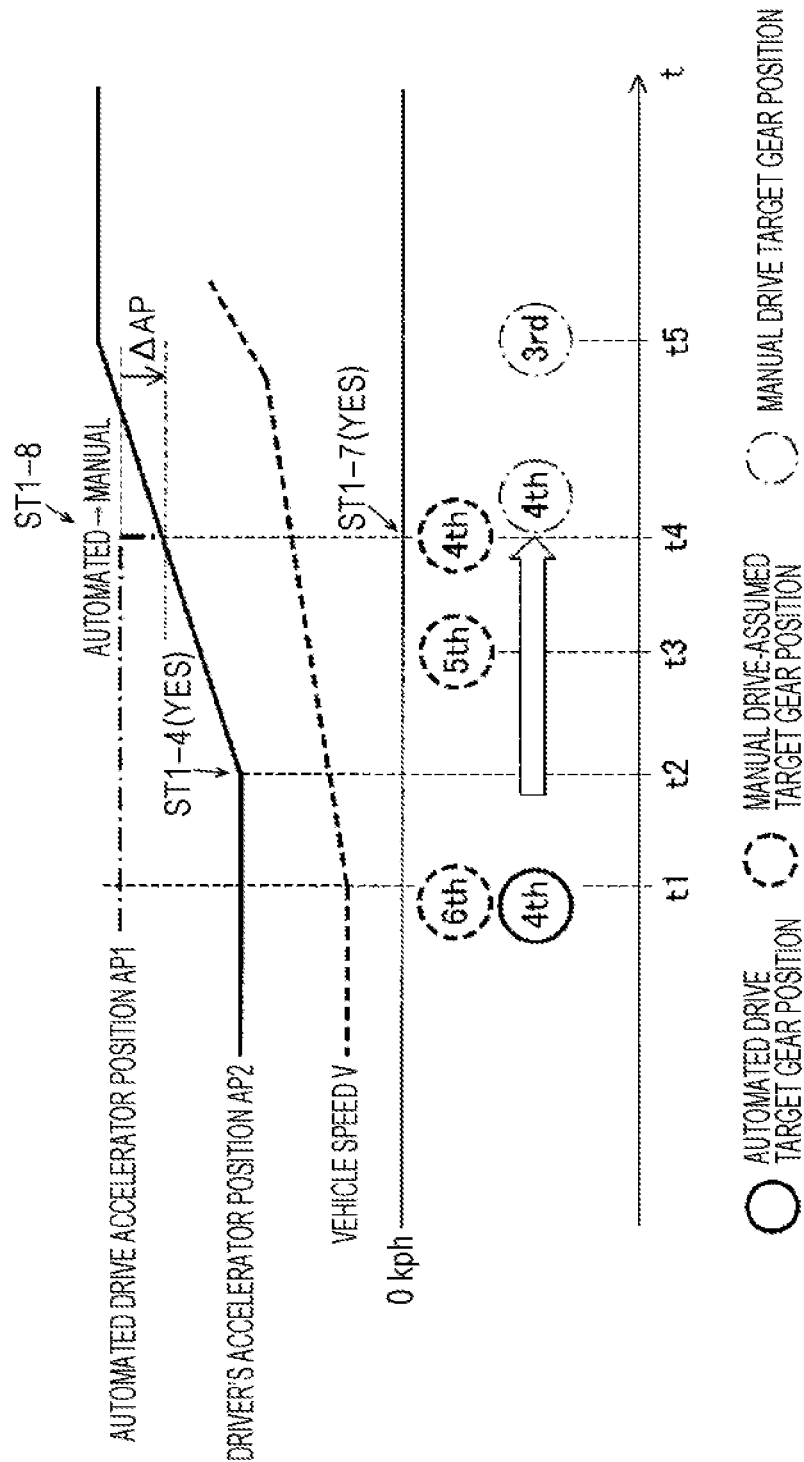
FIG. 5 is a timing chart illustrating content of the override control.
Figure 6:
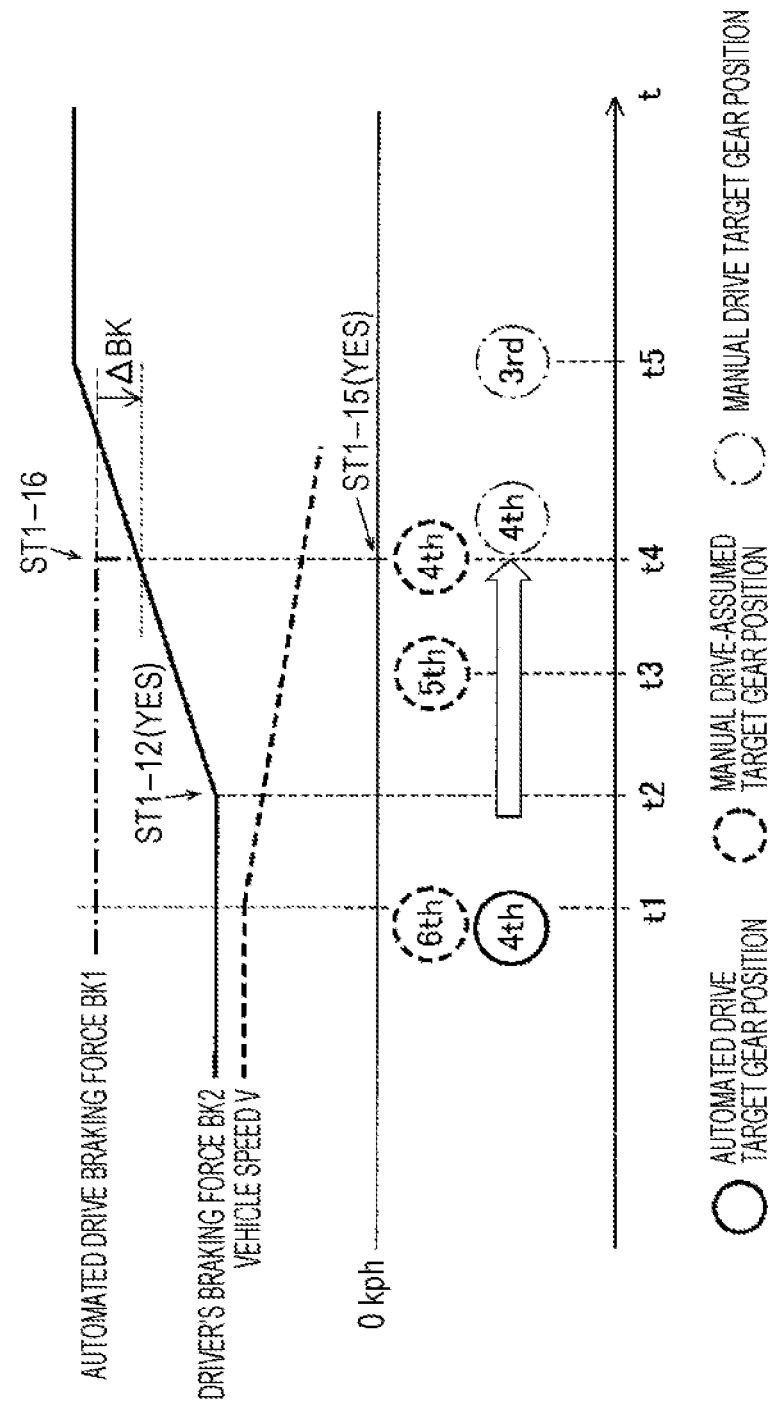
FIG. 6 is a timing chart illustrating the content of the override control.

FIGS. 5 and 6 are timing charts illustrating content of the override control. The override control is described, using these diagrams. First, the timing chart of FIG. 5 shows the accelerator position based on the automated drive control (automated drive accelerator position) AP1, the accelerator position according to the operation of the accelerator pedal 70 by the driver (manual drive accelerator position) AP2, the vehicle speed V, the target gear position of the automated drive mode (automated drive target gear position), the manual drive-assumed target gear position (if the manual drive mode is assumed), the target gear position of the manual drive mode (manual drive target gear position), and change to each elapsed time t. Here, the automated drive target gear position is a $4^{th}$ gear position at time t1 while the vehicle 1 is traveling in the automated drive mode, and the target gar shift stage in the manual drive stage is a $6^{th}$ gear position. In that state, the vehicle 1 enters an acceleration state due to the automated drive accelerator position AP1, and the vehicle speed V is increasing. Then, as the driver starts an operation to step the accelerator pedal 70 at time t2, the manual drive accelerator position AP2 is increasing (if YES in ST1-4 in the flowchart of FIG. 3). Due to the increased vehicle speed V and the increased manual drive accelerator position AP2, the target gear position in the manual state switches to a $5^{th}$ gear position at time t3, and then switches to the $4^{th}$ gear position at time t4. At this point of time, both the automated drive target gear position and the target gear position in the manual stage become the $4^{th}$ gear position and equal each other (if YES in ST1-7). Thus, the drive mode of the vehicle 1 switches from the automated drive mode to the manual drive mode (ST1-8). With this, a value of the automatic accelerator position AP1 is changed to be equal to a value of the manual accelerator position AP2. In addition, immediately thereafter, the manual drive target gear position is set to the $4^{th}$ gear position. Then, the vehicle 1 travels in the manual drive mode and the manual drive target gear position becomes a $3^{rd}$ gear position at time t5.

As such, in the control (override control) shown in the timing chart of FIG. 5, the accelerator position (driving force) inputted through the operation of the accelerator pedal 70 by the driver is sensed. When the gear position (target gear position in the manual state) determined by the vehicle speed V and the accelerator position (manual accelerator position) AP2 according to the operation of the accelerator pedal 70 by the driver equals the gear position (automated drive target gear position) selected in the automated drive mode, the override control in which the acceleration of the vehicle 1 is controlled according to the operation of the accelerator pedal 70 starts to be performed.

Then, the timing chart of FIG. 6 shows the braking force based on the automated drive control (automated drive braking force) BK1, the braking force according to the operation of the brake pedal 72 by the driver (manual drive braking force) BK2, the vehicle speed V, the target gear position of the automated drive mode (automated drive target gear position), the manual drive-assumed target gear position (if the manual drive mode is assumed), the target gear position of the manual drive mode (manual drive target gear position), and change to each elapsed time t. Here, the automated drive target gear position is the $4^{th}$ gear position at the time t1 while the vehicle 1 is traveling in the automated drive mode, and the target gear position in the manual state is the $6^{th}$ gear position. In that state, the vehicle 1 enters a deceleration state due to the automated braking force BK1, and the vehicle speed V is dropping. Then, at the time t2, as the driver starts the operation to step the brake pedal 72 (if YES in ST1-12 in the flowchart of FIG. 4), the manual drive braking force BK2 is increasing. Due to the dropped vehicle speed V and the increased manual drive braking force BK2, the target gear position in the manual state switches to the $5^{th}$ gear position at the time t3, and then switches to the $4^{th}$ gear position at the time t4. At this point of time, both the automated drive target gear position and the target gear position in the manual stage become the $4^{th}$ gear position and equal each other (if YES in ST1-15). Thus, the drive mode of the vehicle 1 switches from the automated drive mode to the manual drive mode (ST1-16). With this, a value of the automated drive braking force BK1 is changed to be equal to a value of the manual drive braking force BK2. In addition, immediately thereafter, the manual drive target gear position is set to the $4^{th}$ gear position. Then, the vehicle 1 travels in the manual drive mode and the manual drive target gear position becomes the $3^{rd}$ gear position at the time t5.

As such, in the override control shown in the timing chart of FIG. 6, the braking force inputted through the operation of the brake pedal 72 by the driver is sensed. When the gear position (manual drive target gear position) determined by the vehicle speed V and the braking force (manual drive braking force) BK2 according to the operation of the brake pedal 72 by the driver equals the gear position (automated drive target gear position) selected in the automated drive mode, the override control in which the deceleration of the vehicle 1 is controlled according to the operation of the brake pedal 72 starts to be performed.

Figure 7:
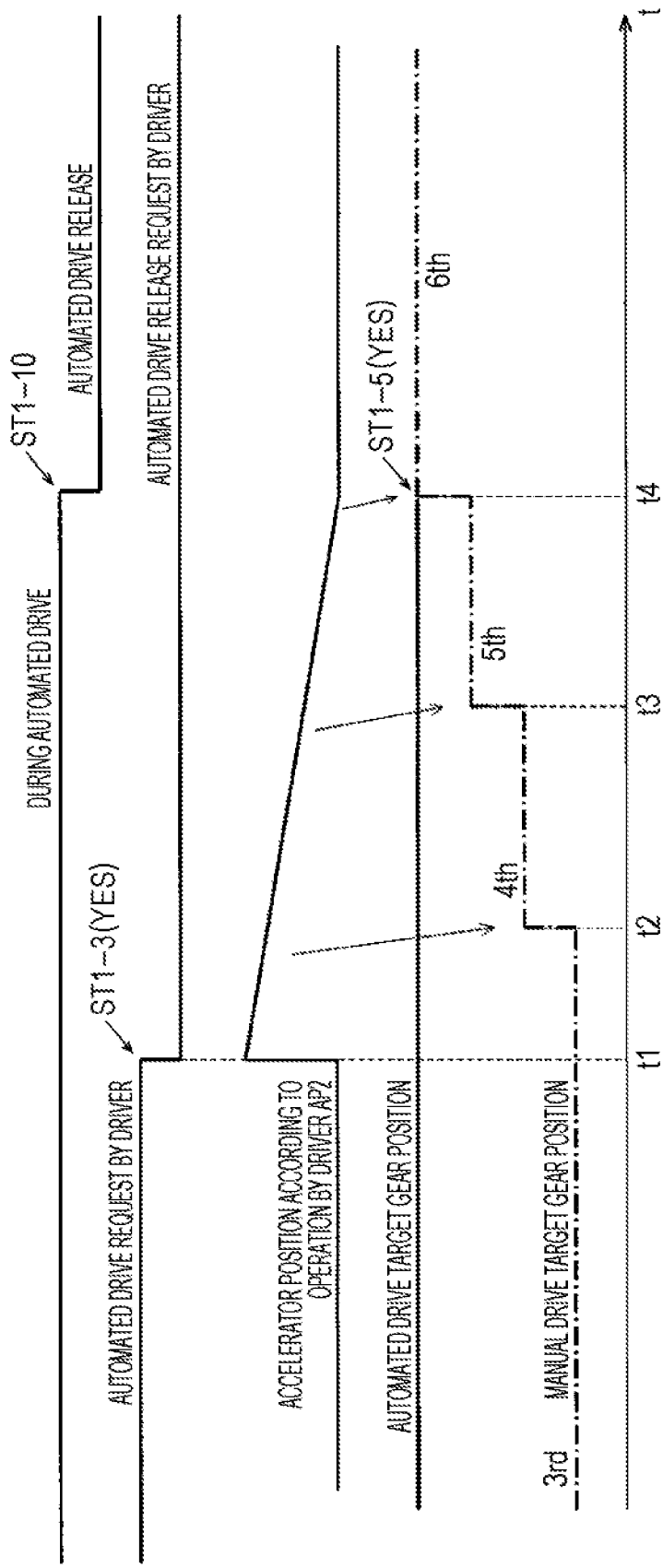
FIG. 7 is a timing chart illustrating content of the drive mode switch control.
Figure 8:
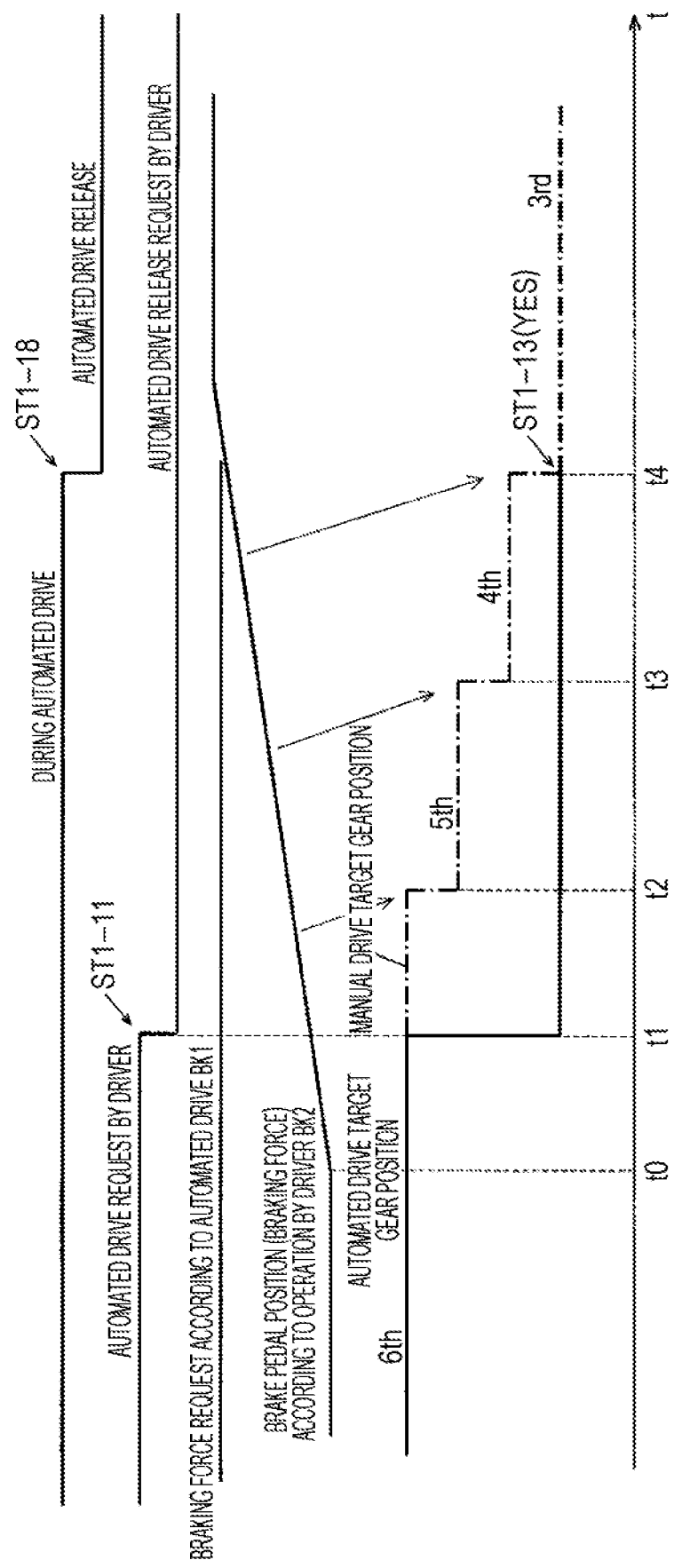
FIG. 8 is a timing chart illustrating the content of the drive mode switch control.

FIGS. 7 and 8 are timing charts illustrating content of the drive mode switch control. First, the timing chart of FIG. 7 shows the drive mode (automated drive mode (automated driving)/manual drive mode (manual drive release)), whether or not the automated drive request and the automated drive release request are made by the driver, the accelerator position according to the operation of the accelerator pedal 70 by the driver (manual drive accelerator position) AP2, the target gear position of the automated drive mode (automated drive target gear position), target gear position of the manual drive mode (manual drive target gear position), and the change to each of the elapsed time t. Here, the automated drive request by the driver is released and switched to the automated drive release request by the driver at the time t1 while the vehicle 1 is traveling under the automated drive mode. More specifically, the automated drive release request is issued at the time t1 (YES in ST1-3). In addition, the automated drive target gear position is the $6^{th}$ gear position at the time t1 and the manual drive target gear position is the $3^{rd}$ gear position. In addition, the manual drive accelerator position AP2 increases as the driver operates the accelerator pedal 70 at the time t1. Then, according to the value of the manual drive accelerator position AP2, the manual drive target gear position switches from the $3^{rd}$ gear position to the $4^{th}$ gear position at the time t2, and from the $4^{th}$ gear position to the $5^{th}$ gear position at the time t3. Then, as a result of switching from the $5^{th}$ gear position to the $6^{th}$ gear position at the time t4, the automated drive target gear position and the manual drive target gear position equal each other (YES in ST1-5). This releases the automated drive mode and switches the drive mode to the manual drive mode (ST1-10).

As such, in the drive mode switch control shown in the timing chart of FIG. 7, when the automated drive release request is made (time t1), the accelerator position (driving force) inputted through the operation of the accelerator pedal 70 by the driver is sensed. When the gear position determined by the vehicle speed V and the accelerator position (manual drive accelerator position) AP2 according to the operation of the accelerator pedal 70 by the driver (manual drive target gear position) equals the gear position selected in the automated drive mode (automated drive target gear position) (time t4), the automated drive mode is released and switched to the manual drive mode.

The timing chart of FIG. 8 shows the drive mode (automated drive mode/manual drive mode), whether or not the automated drive request and the automated drive release request are made by the driver, the braking force (automatic braking force) BK1 according to the automated drive control, the braking force (manual drive braking force) BK2 according to the operation of the brake pedal 72 by the driver, the target gear position of the automated drive mode (automated drive target gear position), the target gear position of the manual drive mode (manual drive target gear position), and the change to each of the elapsed time t. Here, the automated drive request by the driver is released and switched to the automated drive release request by the driver at the time t1 while the vehicle 1 is traveling under the automated drive mode. More specifically, the automated drive release request is issued at the time t1 (ST1-11). In addition, at the time t1, the automated drive target gear position switched from the previous $6^{th}$ gear position to the $3^{rd}$ gear position, and the manual drive target gear position is the $6^{th}$ gear position. In addition, the manual braking force BK2 increases as the driver operates the brake pedal 72 at timing (time t0) earlier than the time t1. Then, according to the value of the manual braking force BK2, the manual drive target gear position switches from the $6^{th}$ gear position to the $5^{th}$ gear position at the time t2 and from the $5^{th}$ gear position to the $4^{th}$ gear position at the time t3. Then, as a result of switching from the $4^{th}$ gear position to the $3^{rd}$ gear position at the time t4, the automated drive target gear position equals the manual drive target gear position (YES in ST1-13). This releases the automated drive mode and switches the drive mode to the manual drive mode (ST1-18).

As such, in the drive mode switch control shown in the timing charge of FIG. 8, when the automated drive release request is made (time t1), the braking force inputted through the operation of the brake pedal 72 by the driver is sensed. If the gear position (manual drive target gear position) determined by the vehicle speed V and the braking force (manual braking force) BK2 according to the operation of the brake pedal 72 by the driver equals the gear position selected in the automated drive mode (automated drive target gear position) (time t4), the automated drive mode is released and switched to the manual drive mode.

Figure 9:
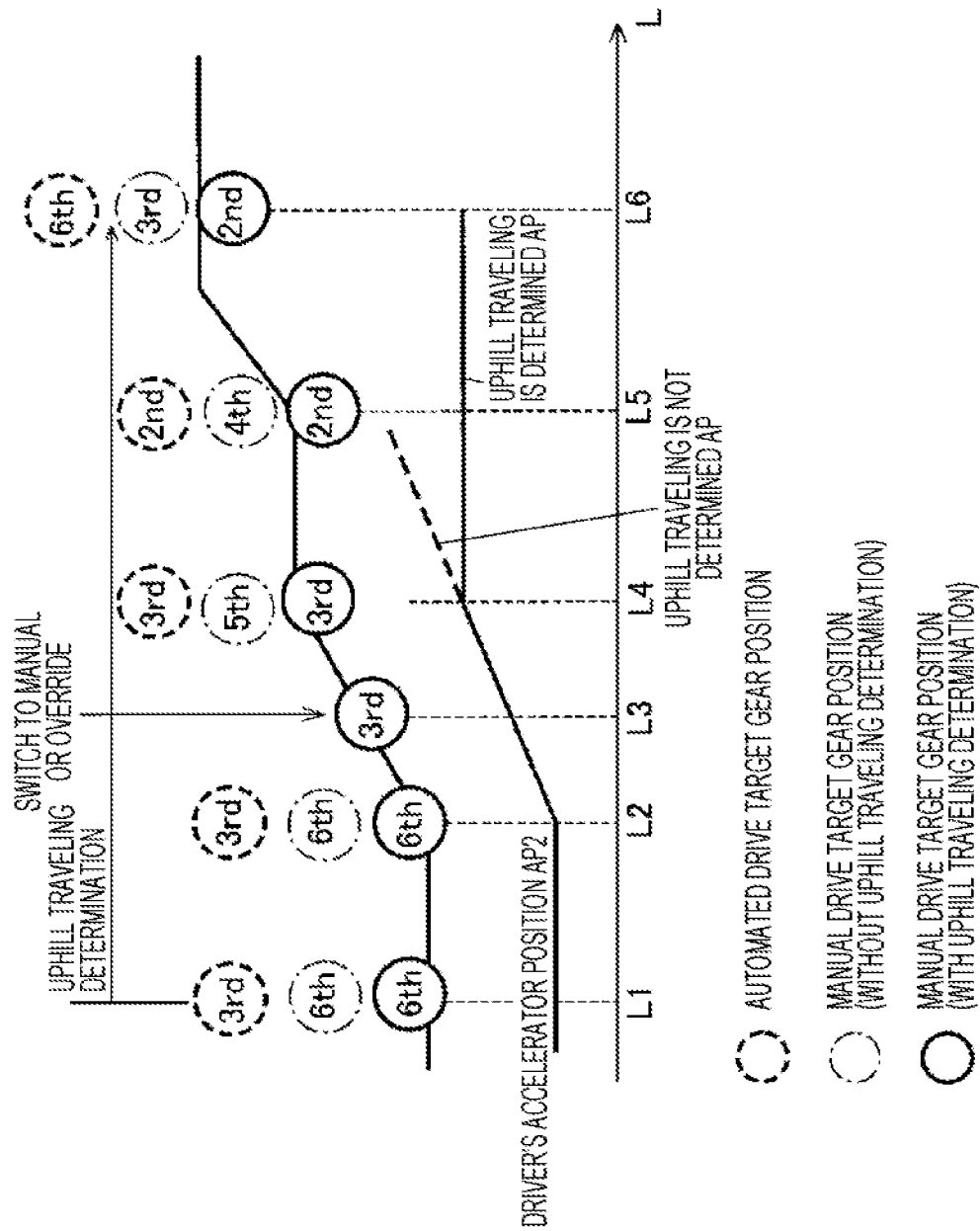
FIG. 9 is a diagram for illustrating a case where switching of a drive mode or a driver's operation (override) takes place while the vehicle is traveling uphill.

In addition, in the override control or the drive mode switch control of the embodiment, the aforementioned manual drive target gear position can be the target gear position (target gear position in the PRO SMATEC control) that is determined by adding the uphill traveling determination/downhill traveling determination of the vehicle 1. In the following, this point is described. FIG. 9 is a diagram for illustrating a case where the automated drive mode switches to the manual drive mode or the driver operates (overrides) the accelerator pedal 70 or the brake pedal 72 while the vehicle 1 is traveling uphill. FIG. 9 shows the automated drive target gear position with respect to a position L in the direction of movement of the vehicle 1, the manual drive target gear position (there is no uphill determinant factor (PRO SMATEC control)), the manual drive target gear position (there is the uphill determinant factor (PRO SMATEC control)), the accelerator position (manual drive accelerator position) AP2 according to the operation of the accelerator pedal 70 by the driver, and respective changes. Here, when the vehicle 1 is at the position L1 and a position L2 where it is traveling on the flat road before the uphill road, the automated drive target gear position is the $3^{rd}$ gear position, and both of the manual drive target gear position (there is no uphill traveling determination) and the manual drive target gear position (there is the uphill traveling determination) are the $6^{th}$ gear position. As the traveling road of the vehicle 1 changes to the uphill road from that state and the manual drive target gear position (there is the uphill traveling determination) switches to the $3^{rd}$ gear position at a position L3, the automated drive target gear position equals the manual drive target gear position (there is the uphill traveling determination). With this, the switch from the automated drive mode to the manual drive mode or the operation (override) of the accelerator pedal 70 or the brake pedal 72 by the driver is performed. Then, the manual drive target gear position (there is no uphill traveling determination) switches to the $5^{th}$ gear position at a position L4, and the automated drive target gear position at a position L5, the manual drive target gear position (there is no uphill traveling determination), and the manual drive target gear position (there is the uphill traveling determination) respectively switch to a $2^{nd}$ gear position, the $4^{th}$ gear position, and the $2^{nd}$ gear position. Furthermore, then, at a position L6, the automated drive target gear position, the manual drive target gear position (there is no uphill traveling determination), and the manual drive target gear position (there is the uphill traveling determination) respectively switch to the $6^{th}$ gear position, the $3^{rd}$ gear position, and the $2^{nd}$ gear position.

As such, in the override control or the drive switch control of the embodiment, when the target gear position (manual drive target gear position) is determined according to the operation of the accelerator pedal 70 by the driver, the determination is made in consideration of the uphill traveling determination/downhill traveling determination of the vehicle. Thus, when the vehicle is in an uphill traveling state or in a downhill traveling state, the target gear position can be set that considers the uphill traveling state or the downhill traveling state. Therefore, it is possible to select, as the manual drive target gear position, a more appropriate gear position that corresponds to the actual traveling state of the vehicle.

Figure 10:
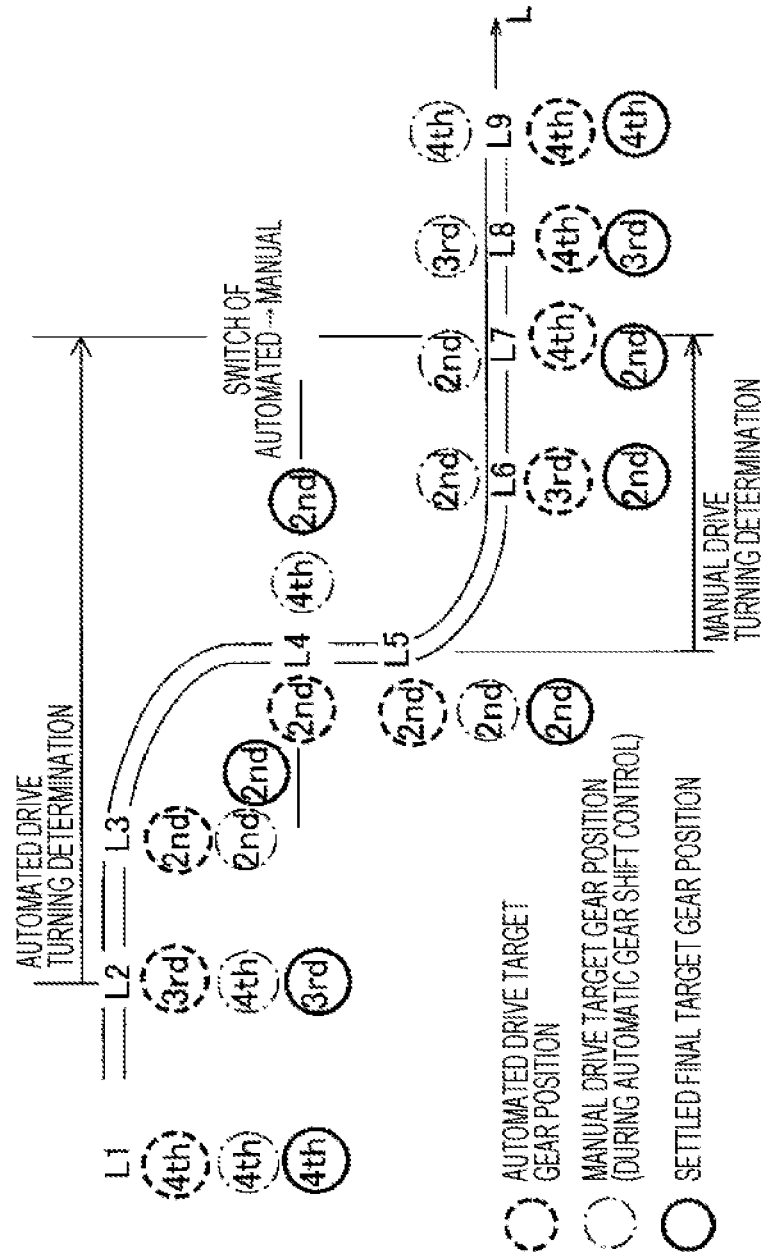
FIG. 10 is a diagram illustrating a case where the drive mode switches while the vehicle is traveling on a winding road (case where a manual drive target gear position is a gear position to be set based on automatic gear position control).

In addition, the override control or the drive mode switch control can be performed if it is determined that the vehicle 1 is turning (traveling on the winding road). In the following, this point is described. FIG. 10 is a diagram showing a case where the drive mode switches from the automated drive mode to the manual drive mode while the vehicle 1 is traveling on the winding road (case where the manual drive target gear position is the gear position that is set based on the automatic gear shift control). FIG. 10 shows the automated drive target gear position, the manual drive target gear position (gear position set based on the automatic gear shift control), and a post-mediation final target gear position, respectively, at the position L1 of the vehicle 1. In this case, at the position L1 before the winding road, both of the automated drive target gear position and the manual drive target gear position are the $4^{th}$ gear position, and the post-mediation final target gear position is the $4^{th}$ gear position. At the position L2 where the vehicle 1 approaches the winding road, the turning determination (winding determination) in the automated drive mode is made, and the automated drive target gear position and the manual drive target gear position are respectively the $3^{rd}$ gear position and the $4^{th}$ gear position, and the post-mediation final target gear position is the $3^{rd}$ gear position. Furthermore, at the position L3 ahead thereof, both of the automated drive target gear position and the manual drive target gear position are the $2^{nd}$ gear position, and the post-mediation final target gear position is the $2^{nd}$ gear position. Then, at the position L4, the automated drive target gear position and the manual drive target gear position are respectively the $2^{nd}$ gear position and the $4^{th}$ gear position, the post-mediation final target gear position is the $2^{nd}$ gear position. At the position L4, the drive mode switches from the automated drive mode to the manual drive mode. At a position L5 ahead thereof, both of the automated drive target gear position and the manual drive target gear position are the $2^{nd}$ gear position and the post-mediation final target gear position is the $2^{nd}$ gear position. At the position L5, the turning determination is made in the manual drive mode. Furthermore, at a position L6 ahead thereof, the automated drive target gear position and the manual drive target gear position are respectively the $3^{rd}$ gear position and the $2^{nd}$ gear position, and the post-mediation final target gear position is the $2^{nd}$ gear position. At a position L7, the automated drive target gear position is the $4^{th}$ gear position. At the position L7, the turning determination of the automated drive mode and the turning determination of the manual drive mode are released. Then, at a position L8, the automated drive target gear position and the manual drive target gear position are respectively the $4^{th}$ gear position and the $3^{rd}$ gear position, and the post-mediation final target gear position is the $3^{rd}$ gear position. In addition, at a position L9, both of the automated drive target gear position and the manual drive target gear position are the $4^{th}$ gear position, and the post-mediation final target gear position is the $4^{th}$ gear position. As such, after the turning determination ends, the switch is performed so that the post-mediation final target gear position gradually equals the manual drive target gear position.

Figure 11:
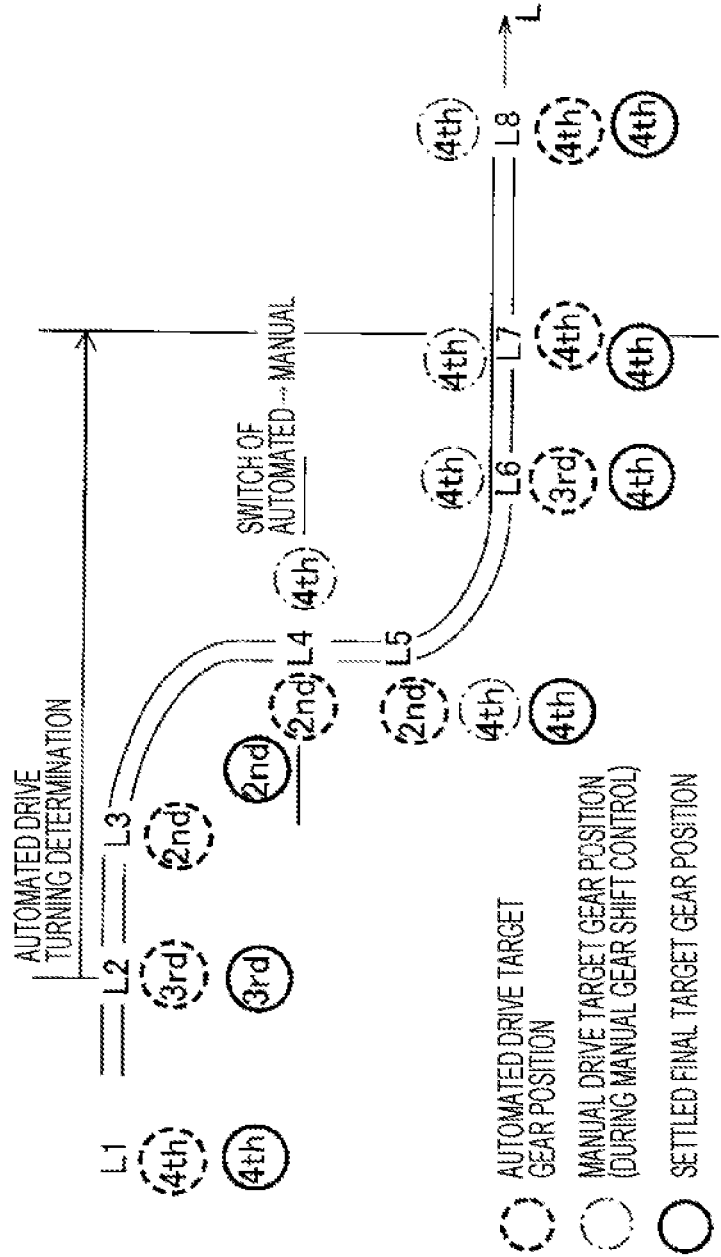
FIG. 11 is a diagram illustrating a case where the drive mode switches while the vehicle is traveling on a winding road (case where a manual drive target gear position is a gear position to be set according to an operation of a paddle switch of the driver).

FIG. 11 is a diagram showing a case where the drive mode switches from the automated drive mode to the manual drive mode while the vehicle 1 is traveling on the winding road (case where the manual drive target gear position is the gear position that is set according to the operation of the paddle switch 65 by the driver). FIG. 10 shows the automated drive target gear position at the position L of the vehicle 1, the manual drive target gear position (gear position set according to the operation of the paddle switch 65 by the driver) and the post-mediation final target gear position, respectively. In this case, at the position L1 before the winding road, the automated drive target gear position is the $4^{th}$ gear position, and the post-mediation final target gear position is the $4^{th}$ gear position. At the position L2 where the vehicle 1 approaches the winding road, the turning determination (winding determination) in the automated drive mode is made, the automated drive target gear position is the $3^{rd}$ gear position and the post-mediation final target gear position is the $3^{rd}$ gear position. Furthermore, at the position L3 ahead thereof, the automated drive target gear position is the $2^{nd}$ gear position, and the post-mediation final target gear position is the $2^{nd}$ gear position. Then, at the position L4, the automated drive target gear position and the manual drive target gear position (gear position set according to the operation of the paddle switch 65 by the driver. Same in the following) are respectively the $2^{nd}$ gear position and the $4^{th}$ gear position. At the position L4, the drive mode switches the automated drive mode to the manual drive mode (gear shift (manual gear shift) mode according to the operation of the paddle switch 65 of the driver). At the position L5 ahead thereof, the automated drive target gear position and the manual drive target gear position are respectively the $2^{nd}$ gear position and the $4^{th}$ gear position, and the post-mediation final target gear position is the $4^{th}$ gear position. Furthermore, at the position L6 ahead thereof, the automated drive target gear position and the manual drive target gear position are respectively the $3^{rd}$ gear position and the $4^{th}$ gear position, and the post-mediation final target gear position is the $4^{th}$ gear position. At the position L7, the automated drive target gear position is the $4^{th}$ gear position. At the position L7, the turning determination of the automated drive mode is released. Then, at the position L8, both of the automated drive target gear position and the manual drive target gear position are the $4^{th}$ gear position, and the post-mediation final target gear position is the $4^{th}$ gear position.

Figure 12:
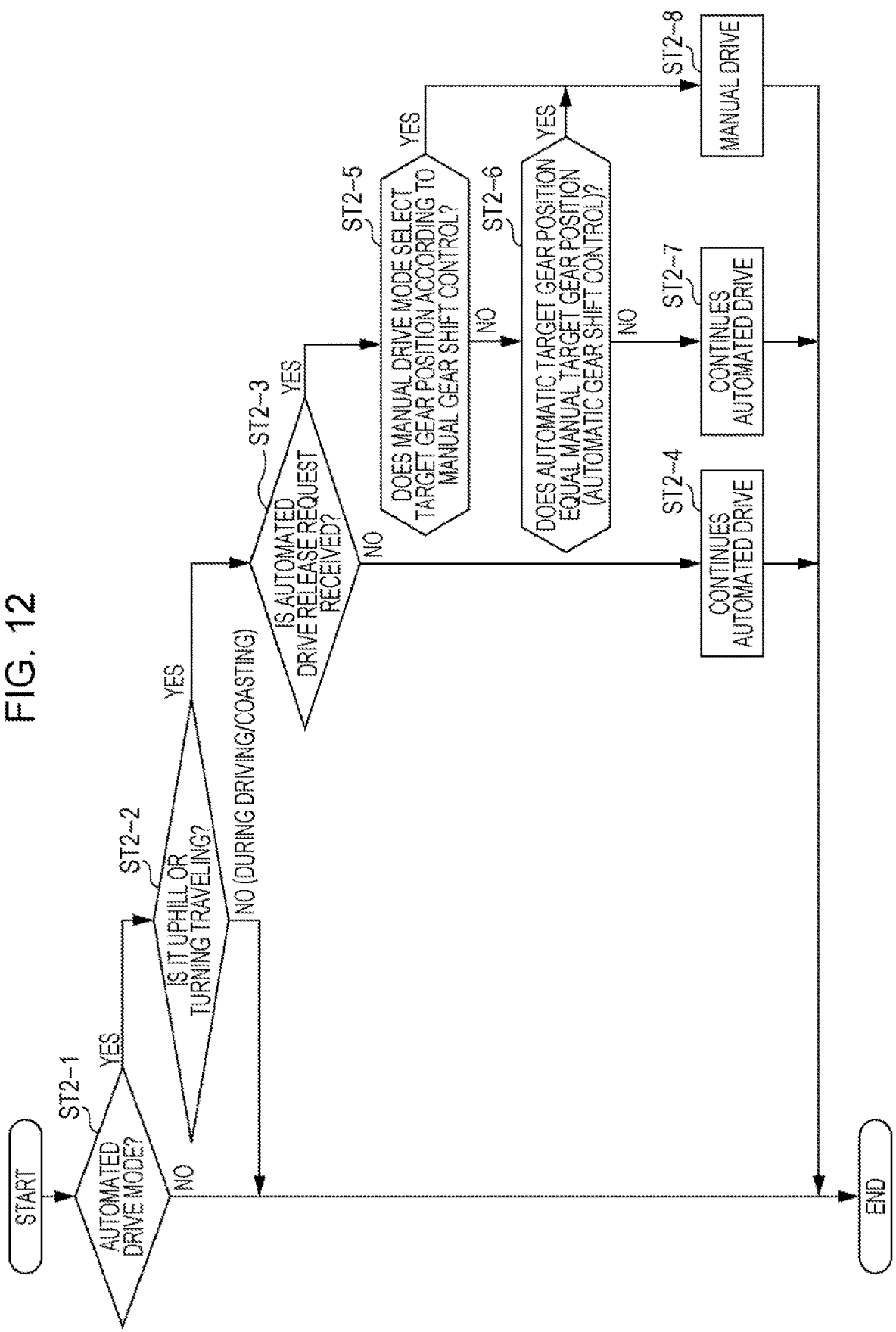
FIG. 12 is a flow chart of a case where the drive mode switch control is performed while the vehicle is traveling uphill or while the vehicle is turning and traveling.

FIG. 12 is a flowchart of a case where the drive mode switch control is performed while the vehicle is traveling uphill or while the vehicle is turning and traveling. In the following, the case where the drive mode switch control is performed while the vehicle is traveling uphill or turning and traveling is described, according to the flowchart. Here, first, it is determined whether or not the drive mode of the vehicle 1 is the automated drive mode (automated driving) (ST2-1). As a result, if the drive mode is not the automated drive mode (NO), the processing just ends. On the other hand, if the drive mode is the automated drive mode (YES), it is then determined whether or not the vehicle 1 is traveling uphill or turning and traveling (ST2-2). As a result, if the vehicle 1 is not traveling uphill or turning and traveling (NO), the processing just ends. If the vehicle 1 is traveling uphill or turning and traveling (YES), the processing proceeds to ST2-3.

In ST2-3, it is determined whether or not the automated drive release request is made. As a result, if no automated drive release request is made (NO), the automated drive mode continues (ST2-4). If the automated drive release request is made (YES), the processing proceeds to ST2-5. In ST2-5, it is determined whether or not the manual drive mode selects the target gear position based on the manual gear shift control (target gear position according to the operation of the paddle switch 65 by the driver) (ST2-5). As a result, if the target gear position based on the manual drive gear shift control is selected (YES), the drive mode is switched from the automated drive mode to the manual drive mode (ST2-8). On the other hand, if the target gear position based on the manual gear shift control is not selected (NO), then, it is determined whether or not the automated drive target gear position equals the manual drive target gear position (gear position set based on the automatic gear shift control) (ST2-6). More specifically, here, the target gear position during cornering or traveling uphill is continuously calculated even during the automated drive, and compared with the automated drive target gear position when the automated drive mode is released. As a result, if the automated drive target gear position does not equal the manual drive target gear position (gear position set based on the automatic gear shift control) (NO), the automated drive mode continues (ST2-7). On the other hand, if the automated drive target gear position equals the manual drive target gear position (gear position set based on the automatic gear shift control) (YES), the drive mode is switched from the automated drive mode to the manual drive mode (ST2-8).

Figure 13:
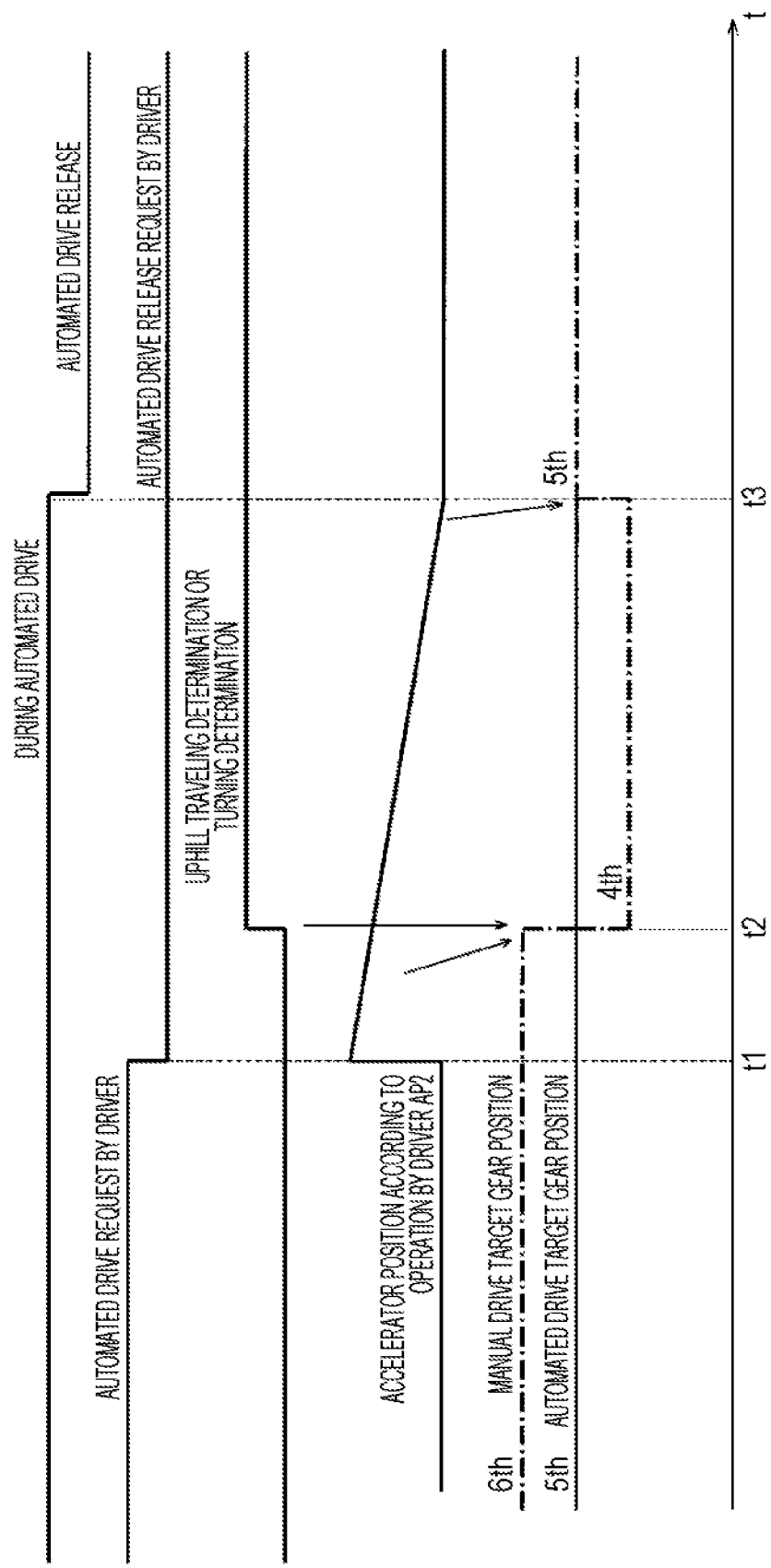
FIG. 13 is a timing chart illustrating a case where an uphill traveling determination or a turning determination is made in the drive mode switch control.

FIG. 13 is a timing chart showing a case where there is the uphill traveling determination or the turning determination in the drive mode switch control. The timing chart of FIG. 13 shows the drive mode (automated drive mode/manual drive mode), whether or not the automated drive request and automated drive release request are made by the driver, the accelerator position (manual drive accelerator position) AP2 according to the operation of the accelerator pedal 70 by the driver, the target gear position of the automated drive mode (automated drive target gear position), the target gear position of the manual drive mode (manual drive target gear position), and the change to each of the elapsed time t. Here, at the time t1 while the vehicle 1 is traveling under the automated drive mode, the automated drive request by the driver is released and switched to the automated drive release request. More specifically, the automated drive release request is issued at the time t1. In addition, at the time t1, the automated drive target gear position is the $5^{th}$ gear position and the manual drive target gear position is the $6^{th}$ gear position. In addition, the manual drive accelerator position AP2 increases as the driver operates the accelerator pedal 70 at the time t1. Then, at the time t2, the uphill traveling determination (or the turning determination) is made. This switches the manual drive target gear position from the $6^{th}$ gear position to the $4^{th}$ gear position according to the value of the manual drive accelerator position AP2 and the uphill traveling determination. Then, at the time t3, as a result of switching from the $4^{th}$ gear position to the $5^{th}$ gear position, the automated drive target gear position equals the manual drive target gear position. This releases the automated drive mode and switches the drive mode to the manual drive mode.

As such, in the drive mode switch control shown in the timing chart of FIG. 13, the manual drive target gear position is the target gear position determined in consideration of the determination (uphill traveling determination) that the vehicle 1 is traveling uphill, in addition to the value of the manual accelerator pedal position AP2 according to the operation of the accelerator pedal 70 by the driver.

Figure 14:
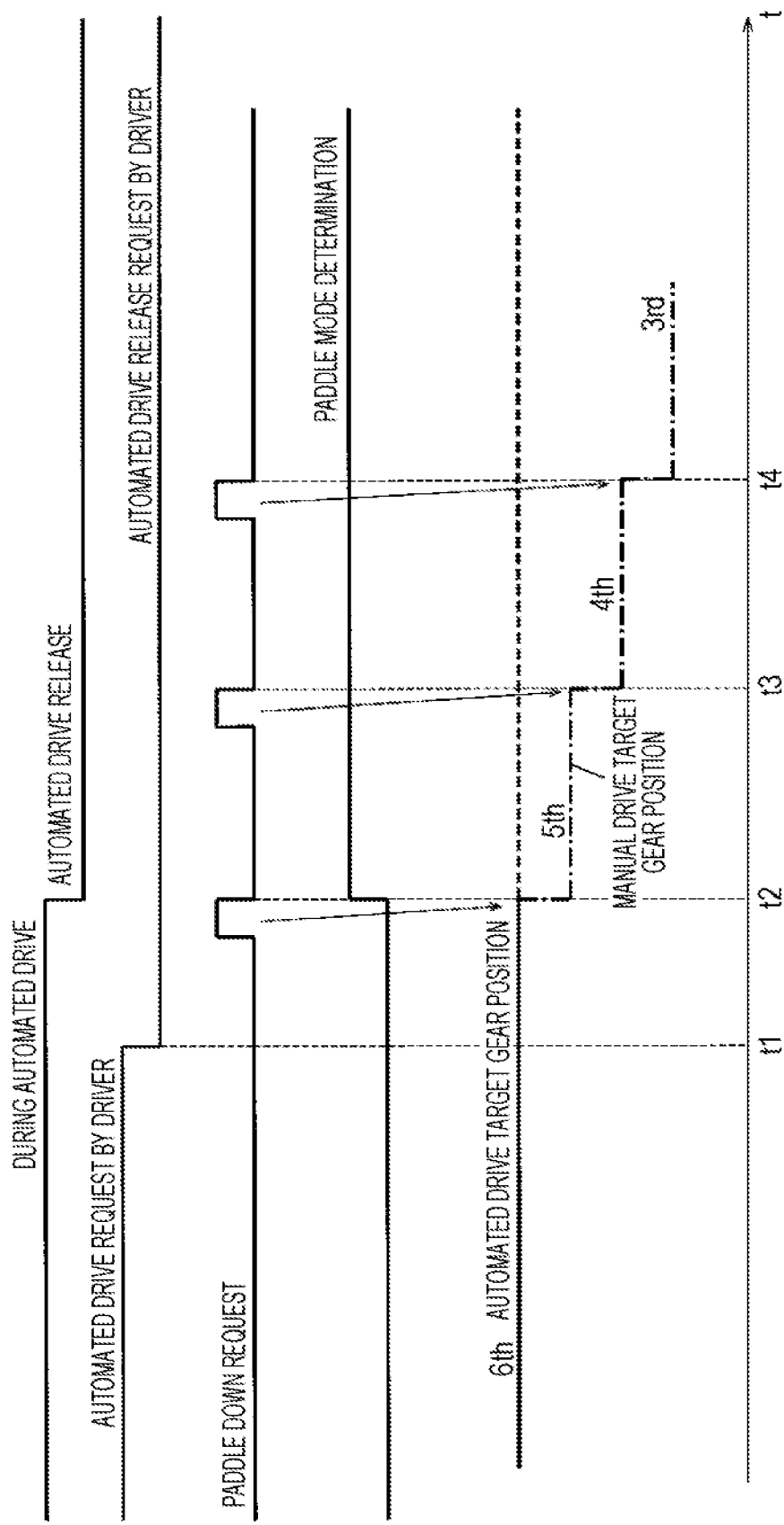
FIG. 14 is a timing chart of a case where the driver operates the paddle switch in the drive mode switch control.

FIG. 14 is a timing chart of a case where the operation of the paddle switch 65 is performed by the driver in the drive mode switch control. The timing chart of FIG. 14 shows the drive mode (automated drive mode/manual drive mode), whether or not the automated drive request and the automated drive release request are made by the driver, whether or not the driver operates the paddle switch 65 (paddle down request), paddle mode determination, the target gear position of the automated drive mode (automated drive target gear position), the target gear position of the manual drive mode (manual drive target gear position), and the change to each of the elapsed time t. Here, the time t1 while the vehicle 1 is traveling under the automated drive mode, the automated drive request by the driver is released and switches to the automated drive release request by the driver. More specifically, the automated drive release request is issued at the time t1. In addition, the automated drive target gear position at the time t1 is the $6^{th}$ gear position. Then, immediately before the time t2, the driver operates the paddle switch 65, and thus the paddle mode determination turns on (paddle mode) at the time t2. This releases the automated drive mode and switches the drive mode to the manual drive mode. In addition, the manual drive target gear position is the $5^{th}$ gear position. Then, immediately before the time t3, the driver operates the paddle switch 65 and thus, at the time t3, the manual drive target gear position switches from the $5^{th}$ gear position to the $4^{th}$ gear position. Furthermore, then, immediately before the time t4, as the driver operates the paddle switch 65, at the time t4, the manual drive target gear position switches from the $4^{th}$ gear position to the $3^{rd}$ gear position.

As such, in the drive mode switch control shown in the timing chart of FIG. 14, when the driver operates the paddle switch 65 (paddle down request) in the automated drive mode, the automated drive mode is released and the drive mode switches to the manual drive mode.

As described above, in the controller of the vehicle 1 in the embodiment, if the driver operates the accelerator pedal 70 or the brake pedal 72 while the vehicle 1 is traveling under the automated drive control, the override control in which the acceleration/deceleration of the vehicle 1 is controlled according to the operation of the driver starts to be performed when the automated drive target gear position equals the manual drive target gear position. Thus, in the adjustment of the acceleration or the deceleration of the vehicle 1 according to the operation of the accelerator pedal 70 or the brake pedal 72 performed by the driver of the vehicle 1 during the acceleration or the deceleration of the vehicle 1 under the automated drive control, the acceleration or the deceleration of the vehicle 1 can be easily adjusted to the acceleration or the deceleration set in the previous automated drive control. Therefore, a smooth shift of the acceleration or the deceleration of the vehicle 1 can be achieved if the driver operates (overrides) the operation member under execution of the automated drive control.

In addition, in the controller of the vehicle 1 in the embodiment, if the automated drive release request is made, the automated drive/manual drive switch control in which the automated drive control is released is performed when the automated drive target gear position equals the manual drive target gear position. Thus, even if the switch to the manual drive control occurs while the vehicle 1 is accelerating or decelerating under the automated drive control, the acceleration or the deceleration of the vehicle 1 is changed through the operation of the accelerator pedal 70 or the brake pedal 72 performed by the driver of the vehicle 1 such that the acceleration or the deceleration of the vehicle 1 can be easily adjusted to the acceleration or the deceleration set in the previous automated drive control. Therefore, it is possible to achieve a smooth shift of the acceleration or the deceleration of the vehicle 1 when switching from the automated drive control to the manual drive control.

In addition, in the controller of the vehicle 1 in the embodiment, the accelerator position (driving force) inputted through the operation of the accelerator pedal 70 by the driver is sensed. When the manual drive target gear position, which is the gear position determined based on the accelerator position inputted by the driver, equals the automated drive target gear position, which is the gear position selected based on the automated drive control, the aforementioned override control or the automated drive/manual drive switch control is performed.

According to this configuration, even if the aforementioned override control or the automated drive/manual drive switch control is performed while the vehicle is traveling with the high driving force such as a case where the vehicle 1 is traveling uphill or on the winding road under the automated drive control, the driver can easily adjust the acceleration of the vehicle 1 by operating the accelerator pedal 70 to the acceleration in the automated drive control. Therefore, it is possible to achieve a smooth shift of the acceleration of the vehicle 1 when switching from the automated drive control to the manual drive control.

In addition, in the controller of the vehicle 1 in the embodiment, the braking force of the vehicle 1 inputted through the operation of the brake pedal 72 by the driver is sensed. When the target gear position determined based on the vehicle speed and the brake position inputted by the driver equals the gear position selected by the automated drive control, the aforementioned override control or the automated drive/manual drive switch control is performed.

According to this configuration, even if the aforementioned override control or the automated drive/manual drive switch control is performed while the vehicle is traveling with the high braking force generated such as a case where the vehicle 1 is traveling uphill or on the winding road under the automated drive control, the driver can easily adjust the deceleration of the vehicle 1 by operating the brake pedal 72 to the deceleration in the automated drive control. Therefore, it is possible to achieve a smooth shift of the deceleration of the vehicle 1 when switching from the automated drive control to the manual drive control.

In addition, in the embodiment, the aforementioned override control or the automated drive/manual drive switch control is performed if it is determined that the vehicle 1 is in the turning state.

Performing the override control or the automated drive/manual drive switch control when it is determined that the vehicle 1 is turning (cornering) makes it possible to inhibit a change in the yaw rate due to the switch of the gear position while the vehicle 1 is turning. Therefore, it is possible to stabilize the behavior of the vehicle 1 when switching from the automated drive control to the manual drive control.

In addition, in the embodiment, the manual drive target gear position in the aforementioned override control or the automated drive/manual drive switch control is the target gear position determined in consideration of the uphill traveling determination/downhill traveling determination of the vehicle 1.

According to this configuration, when the target gear position (manual drive target gear position) is determined according to the operation of the accelerator pedal 70 or the brake pedal 72 by the driver, the determination is made in consideration of the uphill traveling determination/downhill traveling determination of the vehicle 1. Thus, when the vehicle 1 is in an uphill traveling state or downhill traveling state, the target gear position that considers the uphill traveling state or downhill traveling state can be set. Therefore, it is possible to select, as the manual drive target gear position, a more appropriate gear position that corresponds to the actual traveling state of the vehicle 1.

In the embodiment, if the switch request from the automated drive control to the manual drive control is made when the turning determination of the vehicle 1 is made while the vehicle 1 is traveling under the automated drive mode, the manual drive mode takes over the determination made in the automated drive mode, and reflects the turning determination in the determination of the manual drive target gear position.

If the vehicle 1 is in the turning state and the gear position is switched when the automated drive mode switches to the manual drive mode, the yaw rate of the vehicle 1 may change and the behavior may become unstable. In this configuration, however, the manual drive mode takes over the turning determination made in the automated drive mode and reflects the turning determination in the determination on the manual drive target gear position, and therefore it is possible to effectively inhibit switching of the gear position while the vehicle 1 is turning and to keep the change in the yaw rate of the vehicle 1 small. This makes it possible to stabilize the behavior of the vehicle 1.

Also in this case, under the manual drive mode, if the gear position is specified through the operation of the driver, the target gear position is switched from the automated drive gear position as a starting gear position to the manual drive target gear position, even during the turning determination.

In the manual drive mode, if the gear position is specified through the operation of the driver (for example, the operation of the paddle switch 65 to switch the gear position), the driver wishes to switch the gear position of the automatic transmission TM to a desired gear position. Therefore, in that case, even during the turning determination, a priority is given to the specification of the gear position through the operation of the driver, so that the target gear position is switched from the automated drive gear position as the starting gear position to the manual drive target gear position, which is the gear position specified through the operation of the driver. This makes it possible to appropriately reflect a driver's intention.

So far the embodiments of the present disclosure have been described. However, the present disclosure is not limited to the embodiments described above, and various modifications are possible within the scope of the technical idea described in the claims, the specification, and the drawings. For example, the automated drive mode in implementing the gear position switch control as described above automatically controls both the steering angle and the acceleration/deceleration of the vehicle 1. In addition to this, however, the drive mode in implementing modification and control of the target acceleration may be a semi-automated drive mode that automatically controls only the acceleration/deceleration of the vehicle 1.

What is claimed is:

1. A system of controlling a vehicle, comprising:
   a vehicle controller comprising an automated drive control unit configured to perform automated drive control that performs an automatic control of at least acceleration and deceleration of the vehicle and a traveling control unit configured to output a traveling control command value including at least a command value for a driving force of the vehicle;
   a stepwise variable automatic transmission configured to vary a speed of a rotation caused by the driving force transmitted from a driving source to drive a drive wheel and capable of setting a gear position among a plurality of gear positions; and operation members operable by a driver to perform the acceleration and deceleration of the vehicle, wherein the controller is configured to select an automated drive target gear position for the gear position based on the automatic control of the acceleration and deceleration of the vehicle, and determine a manual drive target gear position for the gear position according to the operation of the operation members by the driver, and the traveling control unit is further configured to perform override control which controls the acceleration and deceleration of the vehicle according to the operation of the operation members when the following requirements are satisfied:

(i) the driver operates the operation members during the automated drive control being performed by the automated drive control unit; and (ii) the automated drive target gear position selected based on the automatic control of the acceleration and deceleration of the vehicle equals the manual drive target gear position determined according to the operation of the operation members by the driver.

2. The vehicle controller according to claim 1, wherein the operation members comprise an accelerator determining an accelerator opening position for operating the driving source.

3. The vehicle controller according to claim 1, wherein the operation members comprise a brake operation member for operating a braking force of the vehicle.

4. The vehicle controller according to claim 1, further comprising a turning determination unit configured to determine that the vehicle is in a turning state, wherein the override control is performed when the turning determination unit determines that the vehicle is in the turning state.

5. The vehicle controller according to claim 1, further comprising an uphill/downhill traveling determination unit configured to determine that the vehicle is traveling uphill or downhill, wherein the manual drive target gear position is determined in consideration of a result of an uphill traveling determination/downhill traveling determination made by the uphill/downhill traveling determination unit.

6. A system of controlling a vehicle, comprising:

a vehicle controller comprising a traveling control unit configured to output a traveling control command value including at least a command value for a driving force of the vehicle, the vehicle controller being capable of switchably performing automated drive control and manual drive control, the automated drive control automatically controlling at least acceleration and deceleration of the vehicle, the manual drive control controlling at least the acceleration and deceleration of the vehicle according to an operation of a driver;

a stepwise variable automatic transmission configured to vary a speed of a rotation caused by the driving force transmitted from a driving source to drive a drive wheel and capable of setting a gear position among a plurality of gear positions; and operation members operable by the driver to perform the acceleration and deceleration of the vehicle, wherein the controller is configured to select an automated drive target gear position for the gear position based on the automatic control of the acceleration and deceleration of the vehicle, and determine a manual drive target gear position for the gear position according to the operation of the operation members by the driver, and the traveling control unit is further configured to perform automated drive/manual drive switch control which releases the automated drive control and switches to the manual drive control when the following requirements are satisfied:

(i) an automated drive release request to release the automated drive control and switch to the manual drive control is made during the automated drive control being performed by the automated drive control unit; and (ii) the automated drive target gear position selected based on the automatic control of the acceleration and deceleration of the vehicle equals the manual drive target gear position determined according to the operation of the operation members by the driver.

7. The vehicle controller according to claim 6, wherein the operation members comprise an accelerator determining an accelerator opening position for operating the driving source.

8. The vehicle controller according to claim 6, wherein the operation members comprise a brake operation member for operating a braking force of the vehicle.

9. The vehicle controller according to claim 6, further comprising a turning determination unit configured to determine that the vehicle is in a turning state, wherein the automated drive/manual drive switch control is performed when the turning determination unit determines that the vehicle is in the turning state.

10. The vehicle controller according to claim 6, further comprising an uphill/downhill traveling determination unit configured to determine that the vehicle is traveling uphill or downhill, wherein the manual drive target gear position is determined in consideration of a result of an uphill traveling determination/downhill traveling determination made by the uphill/downhill traveling determination unit.

11. The vehicle controller according to claim 6, further comprising a turning determination unit configured to determine that the vehicle is in a turning state, wherein when the request to switch from the automated drive control to the manual drive control is made when the turning determination unit makes a turning determination of the vehicle while the vehicle is traveling under the automated drive mode, the manual drive control takes over the turning determination made in the automated drive control and reflects the turning determination in determination of the manual drive target gear position.

12. The vehicle controller according to claim 11, wherein under the manual drive control, when the gear position is designated by the operation of the driver, the target gear position is switched from the automated drive target gear position set as a starting gear position to the manual drive target gear position even during the turning determination.

* * * * *